(12) United States Patent
Mourad

(10) Patent No.: US 8,498,580 B2
(45) Date of Patent: Jul. 30, 2013

(54) ESTIMATING LINK QUALITIES IN MULTI-CARRIER SYSTEMS

(75) Inventor: Alain Abdel-Majid Mourad, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 12/574,308

(22) Filed: Oct. 6, 2009

(65) Prior Publication Data

US 2010/0087152 A1 Apr. 8, 2010

(30) Foreign Application Priority Data

Oct. 8, 2008 (GB) .................................... 0818426.9

(51) Int. Cl.
*H04B 17/00* (2006.01)
(52) U.S. Cl.
USPC ....................................................... 455/67.11
(58) Field of Classification Search
None
See application file for complete search history.

(56) References Cited

U.S. PATENT DOCUMENTS

| | | | | |
|---|---|---|---|---|
| 5,574,466 A * | 11/1996 | Reed et al. | ..................... | 342/359 |
| 2003/0072254 A1* | 4/2003 | Ma et al. | ....................... | 370/208 |
| 2005/0147025 A1* | 7/2005 | Auer | ............................ | 370/203 |
| 2007/0258420 A1* | 11/2007 | Alizadeh-Shabdiz et al. | ............................. | 370/338 |
| 2007/0270101 A1* | 11/2007 | Mourad | ..................... | 455/67.11 |
| 2009/0156130 A1* | 6/2009 | Wang et al. | ..................... | 455/68 |

* cited by examiner

*Primary Examiner* — Yuwen Pan
*Assistant Examiner* — Ayodeji Ayotunde
(74) *Attorney, Agent, or Firm* — Jefferson IP Law, LLP

(57) ABSTRACT

A method for estimating qualities of links between a transmitter and a receiver on respective carrier frequencies in a multi-carrier wireless communication system from measurements made during a scanning interval in which pilot signals may be transmitted from the transmitter to the receiver in a plurality of carrier-time bins, each carrier-time bin corresponding to a respective carrier frequency of the multi-carrier system and a respective time slot within the scanning interval, are provided. The method includes, during the scanning interval, making test measurements in less than all of the carrier-time bins, each test measurement comprising transmitting a respective signal from the transmitter to the receiver in a respective carrier-time bin and measuring a strength of the corresponding signal received by the receiver, and using the test measurements to determine at least one of: a value indicative of a predicted quality of a link between the transmitter and the receiver in a carrier-time bin of the scanning interval in which no test measurement is made during the scanning interval, and a value indicative of a predicted quality of a link between the transmitter and the receiver over a period of time within or equal to the scanning interval on a carrier frequency for which no test measurement is made in at least one carrier-time bin during said period of time.

31 Claims, 22 Drawing Sheets

FIG. 18

Determine N from Table 3;

Deduce L from eq (1100);

Compute q = [Nscan/N] and r=mod[Nscan,N];

If r > L-K,
    Number of refresh = q+1;
    Indexes of refresh = [1, ....,q,N];

Else
    Number of refresh = q;
    Indexes of refresh = [1, ....,q];

End

ESTIMATING LINK QUALITIES IN MULTI-CARRIER SYSTEMS

PRIORITY

This application claims the benefit under 35 U.S.C. §119 (a) of a UK patent application filed on Oct. 8, 2008 in the UK Intellectual Property Office and assigned Serial No. 0818426.9, the entire disclosure of which is hereby incorporated by reference.

BACKGROUND OF THE INVENTION

1. Field of the Invention

The present invention relates to multi-carrier wireless communication systems. More particularly, the present invention relates to signals which can be transmitted on a plurality of different carrier frequencies.

2. Background to the Invention

Multi-carrier wireless communication systems (including networks), in which signals can be transmitted from a transmitter to a receiver on a plurality of different carrier frequencies, are known. In such systems, information to be transmitted is typically distributed over a number of the available carrier frequencies. The distribution by the system of the information (in the simplest terms, determining which carrier frequency or frequencies to use at a particular time) is made according to (but not only) the results of measurements made on link qualities. More particularly, the system needs the link qualities as inputs, but also takes into account other inputs like, for example, the load on each carrier frequency in order to decide how to distribute the frequencies to the users. These link quality measurements are to be made during a so-called scanning interval. In this scanning interval, a respective test or pilot signal is sent from the transmitter to the receiver on each carrier frequency and in each of a sequence of time slots. The strengths of the transmitted signals are known, and the strengths of the corresponding received signals are measured, giving an indication of the path loss for each carrier frequency and in each time slot of the scanning interval.

The path loss for each carrier frequency typically comprises three components: a distance-dependent path loss which is simply a function of the distance between the transmitter and receiver; a shadowing or shadow fading component determined by the environment between the transmitter and receiver (in other words, dependent upon what obstacles, if any, there are between the transmitter and receiver); and a fast fading component which results in fluctuations in received signal strength over time scales typically in the range of a few tens to a few hundreds of microseconds. The measurements of received signal strength thus give an indication of the quality of the communication link between the transmitter and the receiver in each carrier-time bin, and the results of the measurements can be used, if desired, to give a value indicative of an average quality of the link on each different carrier frequency over the measurement interval (i.e. the scanning interval). These average quality indications can then be used to decide how to allocate radio resources. For example, a channel for which the measured quality over the scanning interval is high may be used in preference to one for which the measured quality during the scanning interval is low. In this context, a high channel quality may indicate that the received signal to noise ratio over the scanning interval is large, and low quality may indicate that the signal to noise ratio is relatively small. The allocation of radio resources may, of course, be more sophisticated than simply deciding whether to use a particular carrier frequency (or carrier band) or not, and suitable methods for allocating resources according to the results of test measurements in the scanning interval will be apparent to the person skilled in the relevant art.

Thus, in conventional multi-carrier systems, the determination of link qualities for use in determining how to allocate radio resources has necessitated taking a large number of measurements, in particular one measurement for each of the carrier-time bins in the scanning interval. This was because the decisions concerning the allocation of radio resources involves all of the available carrier frequencies, and so measurements were required on the qualities of links on each of the available carrier frequencies. While this conventional technique of taking measurements in each of the carrier-time bins of the scanning interval provided a good indication of link qualities, it was expensive in terms of measurement resources because it required measuring all of the carrier frequencies and all of the time slots. Moreover, this measurement burden (i.e. the number of measurements to be made, and the corresponding amount of processing required) increases with the number of different carrier frequencies that the multi-carrier system is adapted to use.

Accordingly, there is a need for an improved apparatus and method for estimating qualities of links between a transmitter and a receiver in multi-carrier wireless communication systems that can be achieved by making fewer measurements than conventional techniques.

SUMMARY OF THE INVENTION

An aspect of the present invention is to address at least the above-mentioned problems and/or disadvantages and to provide at least the advantages described below. Accordingly, an aspect of the present invention is to provide a method for estimating qualities of links between a transmitter and a receiver in a multi-carrier wireless communication system that can be achieved by making fewer measurements than conventional techniques.

Another aspect of the present invention is to provide various methods for estimating qualities of links between a transmitter and a receiver in a multi-carrier communication system which involve a reduced amount of computation or equivalently processing compared with conventional techniques.

Yet another aspect of the present invention is to provide various methods for estimating qualities of links which can provide an advantageous balance between the number of measurements required, the amount of processing required, and the accuracy of the estimated results.

In accordance with an aspect of the present invention, a method for estimating qualities of links between a transmitter and a receiver on respective carrier frequencies in a multi-carrier wireless communication system from measurements made during a scanning interval in which pilot signals may be transmitted from the transmitter to the receiver in a plurality of carrier-time bins, each carrier-time bin corresponding to a respective carrier frequency of the multi-carrier system and a respective time slot within the scanning interval is provided. The method includes, during the scanning interval, making test measurements in less than all of the carrier-time bins, each test measurement comprising transmitting a respective signal (which may be described as a test or pilot signal) from the transmitter to the receiver in a respective carrier time bin (i.e. the respective pilot signal is transmitted on the respective carrier frequency and within the respective time slot of the respective carrier-time bin) and measuring a strength of the corresponding signal received by the receiver (i.e. a strength of the signal received on the respective carrier frequency within the respective time slot), and using the test measurements (or in other words, the results of those measurements) to determine at least one of: a value indicative of a predicted quality (which may also be described as a likely, probable, or expected quality) of a link between the transmitter and the receiver in a carrier-time bin of the scanning interval in which no test measurement is made during the scanning interval, and a value indicative of a predicted quality (which again may also be described as a likely, probable, or expected quality) of a link between the transmitter and the receiver over a period of time within or equal to the scanning interval on a carrier frequency for which no test measurement is made in at least one carrier-time bin during said period of time.

It will be appreciated that the scanning interval may also be described as comprising a carrier-time interval grid, and each carrier-time bin may equivalently be described as a respective square, region or position within that grid. The term "bin" is thus being used as a convenient label for a particular parameter combination, namely the combination of a particular carrier frequency (or carrier band) and a particular time slot within the scanning interval.

The term "using the test measurements" is intended to encompass a wide variety of techniques, including using just one of the test measurements, using some (i.e. a plurality, but not all) of the test measurements, or using all of the test measurements.

In contrast to the conventional techniques in which test measurements were made in all of the carrier-time bins of the scanning interval, an exemplary method of the invention deliberately makes no test measurement in at least one of the carrier-time bins, and preferably in a plurality of the carrier-time bins. This clearly provides the advantage that the total number of measurements made during the scanning interval is reduced.

For each carrier-time bin in which no measurement is made, a method embodying the invention may determine a value indicative of an expected quality of a link in that bin from at least one (and preferably a plurality) of the measurements made in other carrier-time bins of the scanning interval. This can still yield very useful results because it has been determined that the variations in the qualities of links on different carrier frequencies with time are not completely independent; instead they are correlated, and this correlation may be high. Thus, a good indication of expected quality of a link in one carrier-time bin in which no measurement is made may still be obtained by suitable processing of measurements made in other carrier-time bins. This had not been appreciated in the past.

It will be appreciated that an exemplary method of the invention may be used such that after the end of the scanning interval there is at least a measured or predicted quality value for each of the carrier-time bins, even though the total number of measurements made during the scanning interval is less than the number of carrier-time bins.

In accordance with exemplary embodiments of the present invention, said value indicative of a predicted quality of a link between the transmitter and the receiver in a carrier-time bin is a value indicative of a predicted (likely, probable, or expected) signal-to-noise ratio for a signal received by the receiver from the transmitter in that carrier-time bin.

In accordance with exemplary embodiments of the present invention, said value indicative of a predicted quality of a link between the transmitter and the receiver over a period of time is a value indicative of a predicted (likely, probable, or expected) signal-to-noise ratio or a predicted (likely, probable, or expected) statistical parameter of a signal-to-noise ratio for a signal received by the receiver from the transmitter over said period of time.

Thus, exemplary methods of the invention may be used to determine values indicative of the measured or expected quality of links in each one of the individual carrier-time bins of the scanning interval, and this plurality of individual results may be used in a variety of ways. For example, values can be used simply to determine a value indicative of a mean or average quality of a transmission link in the system on each carrier frequency over the duration of the scanning interval. Alternatively, mean or average qualities may be determined for shorter portions (i.e. sub-divisions) of the scanning interval. The communication system as a whole may be adapted to use the measured and predicted quality values in a variety of ways. For example, allocation of radio resources may be based simply on "channel-average" values, such that the measured and predicted values simply determine whether a channel is used or not during subsequent transmission. Alternatively, the system may take into account variations in channel qualities on a shorter time scale, such that after the scanning interval a particular channel may be used for some, but not all, of the time for subsequent transmission (that is before a next scanning interval in which another assessment of link qualities is made).

In accordance with exemplary embodiments of the present invention, using the test measurements comprises determining a value indicative of a predicted quality of a link between the transmitter and the receiver in a particular carrier-time bin of the scanning interval in which no test measurement is made during the scanning interval using (i.e. from) a said test measurement made in a carrier-time bin for (i.e. corresponding to) a different carrier frequency but the same time slot as the particular carrier-time bin and using (i.e. from) a said test measurement made in a carrier-time bin for (i.e. corresponding to) a different time slot but the same carrier frequency as the particular carrier-time bin.

Such a method is thus able to take advantage of the correlation between qualities of links at different times on the same carrier frequency and the correlation between qualities of links at the same time on different carrier frequencies.

In accordance with exemplary embodiments of the present invention, this determining of a value indicative of a predicted quality of a link between the transmitter and receiver in a particular carrier-time bin additionally uses a test measurement made in a carrier time bin corresponding to a different carrier frequency and a different time slot from the particular carrier-time bin. Thus, in addition to determining a link quality value for a particular carrier-time bin from measurements made in carrier time bins which have either the time slot or carrier frequency in common with the particular time bin, the determination may also be based on at least one test measurement made on a different carrier and at a different time. Again, this can produce a useful, accurate quality indication for the carrier time bin in which no measurement is made because of the correlations between time slots and between carrier frequencies for the fading experienced by the different carrier signals.

In accordance with exemplary embodiments of the present invention, using the test measurements comprises determining a value indicative of a predicted quality (which again may also be described as a likely, probable, or expected quality) of a link between the transmitter and the receiver over a period of time within or equal to the scanning interval on a particular carrier frequency for which no test measurement is made in at least one carrier-time bin during said period of time using (from) at least one said test measurement made in a carrier-time bin on a carrier frequency different from the particular carrier frequency.

Again, the test measurement or measurements made on the different carrier frequency can be used to determine a useful estimate of link quality on the channel for which no measurement is made in at least one carrier-time bin in the period of time because of correlation between the fading (i.e. signal losses and/or attenuations) on different carrier frequencies.

In accordance with exemplary embodiments of the present invention, using the test measurements comprises determining a plurality of said values, each indicative of a predicted quality of a link between the transmitter and the receiver in a respective carrier-time bin of the scanning interval in which no test measurement is made during the scanning interval.

Advantageously, the greater the number of carrier-time bins in which no test measurements are made, the smaller the total number of measurements that are required to be made during the scanning interval. This facilitates the scanning procedure. Link qualities may, however, be predicted with useful accuracy from the measurements that are made during the scanning interval.

In accordance with exemplary embodiments of the present invention, determining said plurality of values comprises determining a respective said value for each carrier-time bin of the scanning interval in which no test measurement is made during the scanning interval.

In accordance with exemplary embodiments of the present invention, using the test measurement comprises determining a plurality of values, each indicative of a predicted quality of a link between the transmitter and the receiver over a period of time within or equal to the scanning interval on a respective carrier frequency for which no test measurement is made in at least one carrier-time bin during said period of time.

In accordance with exemplary embodiments of the present invention, the determination of each predicted or expected said value from (i.e. using) test measurements may be based on assumptions regarding the correlation between variations in quality on one channel and at least one other. For example, it may be assumed that the variation in link quality on one channel may exactly follow the variation in link quality on another. In such examples, test measurements may be made on only one carrier frequency during the scanning interval, and link qualities may be predicted for at least one other carrier frequency channel during the scanning interval from those measurements.

Alternatively, instead of assuming any particular degree of correlation, correlations may be determined from the actual measurements. These measurements could be the test measurements themselves (i.e. correlations in time and/or between carrier frequencies may be determined from test measurements made during the scanning interval). Alternatively, a plurality of preliminary measurements may be made at some time or times before the scanning interval in order to provide an amount of correlation information.

Thus, in accordance with an exemplary embodiment of the present invention, the method further comprises, prior to the scanning interval, making a plurality of preliminary measurements, said preliminary measurements being indicative of a least one of: a variation with time in a quality of a link between transmitter and receiver on at least one of said carrier frequencies in the multi-carrier wireless communication system, and a correlation between the quality of a link between transmitter and receiver on one of said carrier frequencies in the multi-carrier system and a quality of a link between transmitter and receiver on at least one different one of said carrier frequencies in the multi-carrier system.

In accordance with exemplary embodiments of the present invention, the method may thus further comprise using the preliminary measurements and the test measurements (i.e. using the preliminary measurements together with the test measurements) to determine the or each said value.

Again, it will be appreciated that the step of using the preliminary measurements and using the test measurements does not necessarily imply that all of each set of measurements is used. Instead, the term is intended to encompass using at least one preliminary measurement together with at least one test measurement, using at least one measurement from one group and a plurality (but not all) of the measurements from the other group, using a plurality of measurements (but not all) from the preliminary group and from the test group, and using all of the preliminary and test measurements together.

In accordance with exemplary embodiments of the present invention, making the plurality of preliminary measurements comprises transmitting a signal on at least one carrier frequency from a transmitting location (i.e. from transmitter) and measuring a strength of a corresponding signal received by a receiver (e.g. at a receiving location) as a function of time. This could be achieved, for example, by continuously transmitting a signal from the transmitting location and measuring the variation in strength of the corresponding signal received by the receiver as a function of time (for example as the receiver moves with respect to the transmitting location). Alternatively, it could be achieved by transmitting a first signal from a transmitter at a first time (or within a first time interval) and then transmitting a second signal at a second time (or within a second time interval). Whichever of these methods, or indeed other methods, are used to make the preliminary measurements, in these exemplary embodiments at least two measurements indicative of link quality are made on a single particular carrier but at different times. This gives information on how shadow fading on that carrier frequency may vary with time.

In accordance with exemplary embodiments of the present invention, making the preliminary measurements comprises transmitting a plurality of signals simultaneously from a transmitting location on a plurality of different respective carrier frequencies and measuring the respective strengths of corresponding signals received by receiver. Thus, in certain exemplary embodiments the preliminary measurements comprise making at least two simultaneous measurements on two different carrier frequencies, thereby giving information on, or at least information which can be used to calculate, a correlation between shadow fading on one carrier band and another.

It will be appreciated that the transmitter and the receiver used to make the preliminary measurements may be the same transmitter and receiver involved in the test measurements. This could therefore be the transmitter and receiver (such as a mobile communication device such as a mobile phone) which are to be used during the subsequent communication (i.e. when actual information is being conveyed from the transmitting to the receiver, rather than just test signals to establish link qualities). Alternatively, at least one of the transmitter and receiver in the preliminary measurement stage may be different from that in the test measurement stage. Thus, a different apparatus may be used in order to make preliminary measurements to provide information on time and carrier correlation in the multi-carrier communication system, and that information may, for example, be stored for use later on in conjunction with test measurements to predict link qualities for subsequent communication.

In accordance with exemplary embodiments of the present invention, the method further comprises determining at least one statistical parameter of the preliminary measurements.

In accordance with exemplary embodiments of the present invention, the step of using the preliminary measurements and the test measurements to determine the or each said value comprises using the at least one statistical parameter.

The at least one statistical parameter may comprise at least one of a standard deviation and a correlation coefficient.

For example, each preliminary measurement may yield a result which is indicative of a received signal strength, a path loss on a particular carrier frequency, a difference between path losses on two different carrier frequencies, a gain or attenuation on a particular carrier frequency, etc. The at least one statistical parameter determined may, for example, be a mean or average, a variance or standard deviation, or other statistical parameter of these values. Similarly, the at least one statistical parameter may comprise a correlation coefficient indicative of a correlation between one set of these values and another, for example a correlation between a path loss on one carrier frequency and another.

In accordance with exemplary embodiments of the present invention, the method further comprises determining a correlation matrix being indicative of a correlation in time and between carrier frequencies of link qualities on each of the carrier frequencies of the system.

This correlation matrix may, for example, have one dimension corresponding to the number of carrier frequencies in the multi-carrier system and another dimension corresponding to a number of time slots over which the preliminary measurements are made. This number of time slots over which the preliminary measurements are made may, for example, correspond to the number of time slots in the scanning interval, and indeed the preliminary measurements may be made during a preliminary measurement interval corresponding to the scanning interval (i.e. comprising the same number of carrier-time bins, carrier-time bin having the same duration as in the scanning interval).

In accordance with exemplary embodiments of the present invention, the method comprises using the correlation matrix and the test measurements (i.e. using the correlation matrix together with the test measurement) to determine the or each said value.

In accordance with exemplary embodiments of the present invention, making said test measurements comprises making a respective test measurement in each of at least two respective time slots for each of at least one carrier frequency in the scanning interval.

In accordance with exemplary embodiments of the present invention, making said test measurements comprises making a respective test measurement in each time slot of the scanning interval. In alternative exemplary embodiments, however, there may be some time slots in which no test measurements are made.

In accordance with exemplary embodiments of the present invention, making said test measurements comprises making at least one respective test measurement on each of at least two carrier frequencies during the scanning interval.

In accordance with exemplary embodiments of the present invention, making said test measurements comprises making at least one respective test measurement on each of the plurality of carrier frequencies during the scanning interval. Thus, in certain exemplary embodiments measurements are made on all of the carrier frequencies useable by the system. This is advantageous as it provides more information on the correlation between shadow fading on the different carrier frequencies, and so enables more accurate quality values to be predicted for those carrier-time bins in which no measurements are made during the scanning interval.

In accordance with exemplary embodiments of the present invention, making said test measurements comprises making a test measurement in a carrier-time bin corresponding to a first carrier frequency and a first time slot, and making at least one additional test measurement, each additional test measurement being made in a respective carrier-time bin corresponding to a different carrier frequency from the first carrier frequency and a different time slot from the first time slot.

In accordance with exemplary embodiments of the present invention, making said test measurements comprises making a first plurality of said test measurements in a first period of the scanning interval, the first plurality of test measurements comprising a respective test measurement on each of the plurality of carrier frequencies.

In accordance with exemplary embodiments of the present invention, each of this first plurality of test measurements is made in a different respective time slot. This provides the advantage that the first plurality of test measurement provides a spread of measurements over the full number of carrier frequencies and a corresponding number of time slots. These measurements can then be used to predict qualities of links in carrier-time bins in which no test measurements are made with greater accuracy.

In accordance with exemplary embodiments of the present invention, using the test measurements comprises determining a respective value indicative of a predicted quality of a link between the transmitter and the receiver in each carrier-time bin of the first period of scanning interval in which no test measurement is made from all of the first plurality of measurements. Using all of the first plurality of measurements in this way improves the accuracy of the predicted link quality values. In alternative exemplary embodiments, however, not all of the first plurality of measurements need be used. This can facilitate the calculating, but at the cost of accuracy.

For example, in accordance with exemplary embodiments of the present invention, using the test measurements comprises determining a respective value indicative of a predicted quality of a link between the transmitter and the receiver in each carrier-time bin of the first period of scanning interval in which no test measurement is made by multiplying a result of a respective one of the first plurality of test measurements by a respective multiplication factor. In certain exemplary embodiments the multiplication factor has been determined from preliminary measurements, and the factor may, for example, be a shadowing time correlation factor, lambda.

In accordance with exemplary embodiments of the present invention, making said test measurements comprises making a second plurality of said test measurements in a second period of the scanning interval, the second plurality of test measurements comprising a respective test measurement on each of the plurality of carrier frequencies.

As with the first plurality of test measurements, each of the second plurality of test measurements in certain exemplary embodiments may be made in a different respective time slot.

Similarly, using the test measurements may comprise determining a respective value indicative of a predicted quality of a link between the transmitter and the receiver in each carrier-time bin of the second period of scanning interval in which no test measurement is made from all of the second plurality of measurements.

In accordance with exemplary embodiments of the present invention, the second period of the scanning interval is immediately after the first period of the scanning interval.

Alternatively, in other exemplary embodiments the second period of the scanning interval begins a time interval (which may be described as a delay time interval, or a refreshment time interval) after the end of the first period of the scanning interval.

By having the second period immediately after the first period, the accuracy of predicted quality values may be kept high. However, this measurement system does require the carrier frequency on which the test measurement is made to be switched very frequently. Thus, in certain exemplary embodiments it is desirable to have the time interval between the first and second periods to reduce the amount of carrier switching that needs to take place. This can facilitate the measurement procedure, but at the expense of accuracy. However, certain exemplary embodiments are able to determine the interval so as to maintain accuracy above a predetermined threshold, and those exemplary embodiments are described below.

In accordance with exemplary embodiments of the present invention, making said test measurements comprises making a third plurality of said test measurements in a third period of the scanning interval, the third period being between the first and second periods.

In accordance with exemplary embodiments of the present invention, each of the third plurality of test measurements is made in a different respective time slot but on the same carrier frequency. Thus, the first and second period of the scanning interval are used to make measurements on all carrier frequencies, and in the third period measurements can be made on just one (e.g. a primary) carrier frequency so as to reduce the amount of switching between carrier frequencies that need be made during the scanning interval as a whole.

In accordance with exemplary embodiments of the present invention, using the test measurements comprises determining a respective value indicative of a predicted quality of a link between the transmitter and the receiver in each carrier-time bin of the third period of scanning interval in which no test measurement is made from a measurement made in another carrier-time bin of the third time period and at least one test measurement made during the first time period.

In accordance with exemplary embodiments of the present invention, the method may comprise making no test measurements between the first and second periods. The interval between the first and second periods may then be arranged so as to maintain a certain accuracy in the predicted quality of links.

In accordance with exemplary embodiments of the present invention, making the test measurements comprises making a fourth plurality of test measurements in a fourth period of the scanning interval, the fourth period being after the second period. For example, each of the fourth plurality of test measurements may be made in a different respective time slot on the same single carrier frequency.

In accordance with exemplary embodiments of the present invention, making said test measurements comprises making a respective group of said test measurements in each of a series of blocks of the scanning interval, each group of test measurements comprising a respective test measurement on each of the plurality of carrier frequencies, and adjacent blocks in the series being separated by a respective time interval.

Again, the respective time interval may be determined in order to keep the accuracy in predicted link qualities above a predetermined threshold.

In accordance with exemplary embodiments of the present invention, the method further comprises estimating a quality of a said link by determining a statistical parameter of a plurality of said values. This could, for example, comprise the determining of an average or mean of said values over a period of time.

In accordance with exemplary embodiments of the present invention, the receiver includes a mobile receiver traveling at a speed $v(t)$ (i.e. the speed or velocity of the apparatus relative to some reference point, such as the ground, is a function of time) and the method further includes measuring a first speed $v_0$ of the mobile receiver at a first time $t_o$, performing a plurality of measurements of received signal strength at the mobile receiver versus time on at least one carrier frequency in a first time period following said first time (in other words, a plurality of signal strength measurements are made, each comprising transmitting a signal from transmitter to the mobile receiver (which may, of course be capable of transmitting signals also) and measuring the strength of the corresponding received signal, each measurement being made at a respective time, or within a respective time slot, in a series or sequence of times or time slots), calculating from the first plurality of measurements a first value of a parameter indicative of a rate of variation of a received signal strength with time at the mobile receiver resulting from time-dependent fading between the transmitter and the receiver, measuring a second speed $v_n$ of the mobile receiver at a second, later time $t_n$, and calculating a second value of said parameter, indicative of a second rate of said variation corresponding to speed $v_n$, from the said first value and the first and second speeds.

Thus, the first value of the parameter is indicative of the rate of variation when the mobile is traveling at the first, initial speed, and the second value indicates the generally different rate of variation when the apparatus is traveling at the second speed.

It will be appreciated that the determining of the first value of the parameter can be arranged so as to take into account any distance-dependent fading effects, such that the determined value substantially reflects just shadow fading effects.

In accordance with exemplary embodiments of the present invention, the method further comprises using said second value to determine at least one of said values indicative of a predicted quality of a link. Thus, a value of the parameter u, for example, can be determined, specific to a particular time slot in the scanning interval (i.e. corresponding to the particular speed of the mobile in that time slot), and can be used to determine a more accurate value indicative of predicted link quality in that time slot.

In accordance with exemplary embodiments of the present invention, said performing of a plurality of measurements is performed before the scanning interval, for example at or soon after a start-up, initialization, handover, or switch-on event or procedure.

In accordance with exemplary embodiments of the present invention, the method further comprises determining a measurement time interval according to the first speed, and said performing a plurality of measurements comprises performing a respective measurement of received signal strength at each of a series of times, adjacent said times being separated by the measurement time interval.

In accordance with exemplary embodiments of the present invention, said second time falls within the scanning interval.

In accordance with exemplary embodiments of the present invention, said parameter indicative of a rate of variation of a received signal strength with time is an exponential time decay rate parameter u.

In accordance with exemplary embodiments of the present invention said first value is $u_0$, said second value is $u_n$, and $u_n = u_0(v_n/v_0)$.

In accordance with another aspect of the invention, a method of transmitting a signal from a transmitter to a receiver in a multi-carrier wireless communication system in which signals may be transmitted from the transmitter to the receiver on a plurality of different carrier frequencies is provided. The method includes determining at least one of said value indicative of a predicted quality of a link between the transmitter and the receiver using a method in accordance with the first aspect of the invention, using the determined value or values to select at least one of said plurality of carrier frequencies, and using the selected carrier frequency or frequencies to transmit said signal.

In accordance with an exemplary embodiment of the present invention, the determining may comprise determining at least one said value for each of the plurality of carrier frequencies using a method in accordance with the first aspect of the invention.

In accordance with yet another aspect of the invention, a method of allocating radio resources in a multi-carrier wireless communication system in which signals may be transmitted from the transmitting apparatus to the receiving apparatus on a plurality of different carrier frequencies is provided. The method includes estimating qualities of links between the transmitting and receiving apparatus on a plurality of said carrier frequencies, and allocating radio resources according to said estimated qualities (i.e. according to the determined values).

It will be appreciated that in this context the allocating of radio resources may comprise determining which of the available carrier frequencies a particular signal or signals is to be transmitted on, how the allocation of carrier frequencies is to vary with time, with volume of signal traffic, or with other factors that will be understood by the person skilled in the relevant art.

In accordance with still another aspect of the invention, a method of determining a value of a parameter indicative of a rate of variation of a received signal strength with time at mobile receiver, traveling at a speed v(t), as a result of time-dependent fading (i.e. in a signal transmission path) between transmitter (transmitting a signal to the receiver) and the receiver is provided. The method includes measuring a first speed $v_0$ of the mobile receiver at a first time $t_o$, performing a plurality of measurements of received signal strength at the mobile receiver versus time in a first time period following said first time, determining from the first plurality of measurements a first value of a parameter indicative of a first rate of said variation of received signal strength with time, measuring a speed $v_n$ of the mobile receiver at a later time $t_n$, and determining a second value of said parameter, indicative of a second rate of said variation corresponding to speed $v_n$, from the first said value and the first and second speeds.

In accordance with exemplary embodiments of the present invention, the method further comprises determining a measurement time interval according to the first speed, and said performing of the plurality of measurements comprises performing a respective measurement of received signal strength at each of a series of times, adjacent said times being separated by the measurement time interval.

In accordance with exemplary embodiments of the present invention, said parameter indicative of a rate of variation of a received signal strength with time is an exponential time decay rate parameter u. In certain exemplary embodiments said first value is $u_0$, said second value is $u_n$, and $u_n = u_0 (v_n/v_0)$.

In accordance with still another aspect of the invention, a multi-carrier wireless communication system is provided. The system includes a transmitter and a receiver and in which signals may be transmitted from the transmitter to the receiver on a plurality of different carrier frequencies, the system being adapted to carry out any of the above described methods.

Another aspect of the invention provides a transmitter adapted for use in a multi-carrier wireless communication system embodying the invention.

Yet another aspect of the invention provides a receiver adapted for use in a multi-carrier wireless communication system embodying the invention.

Another aspect of the invention provides apparatus comprising means to implement a method in accordance with any one of the above-mentioned aspects of the invention.

Yet another aspect of the invention provides a computer program comprising instructions arranged, when executed, to implement a method as claimed in any claim and/or a system as claimed in any claim of this specification.

Another aspect of the invention provides machine-readable storage for storing a program as defined immediately above.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which The above and other aspects, features, and advantages of certain exemplary embodiments of the present invention will now be more apparent from the following description taken in conjunction with the accompanying drawings, in which:

FIG. 18 illustrates a method for determining the number and indexes of measurement blocks within the scanning interval according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
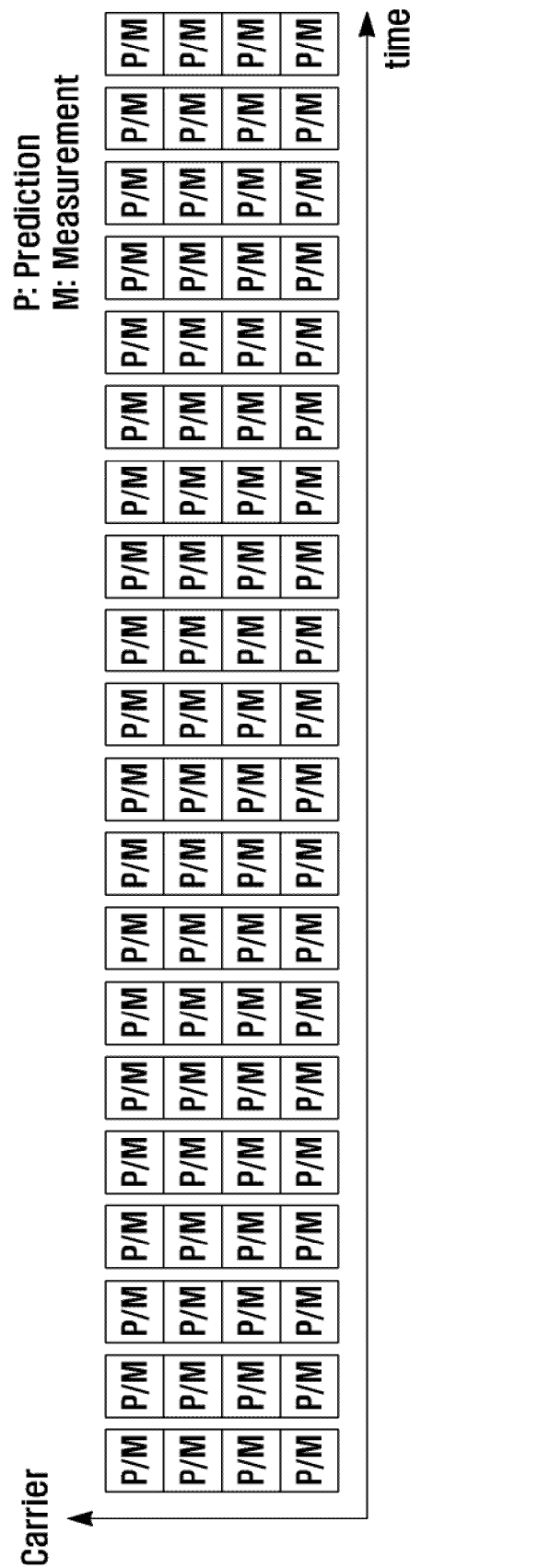
FIG. 1 is a schematic representation of a carrier-time grid for link quality measurement and prediction during a scanning interval or a preliminary test measurement period or interval according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As will be appreciated from the above summary, certain exemplary embodiments of the invention provide methods for link quality prediction using shadowing carrier-time correlation in multi-carrier wireless networks.

Certain exemplary embodiments of the invention apply to (i.e. are concerned with, and may be utilized in) the radio interface of multi-carrier wireless networks. Examples of such networks/systems are dual band GSM, multi-carrier UMTS, 3GPP LTE, IEEE802.15, WiMAX IEEE802.16, etc., but this list is by no means comprehensive and the invention is not limited in its application to these particular systems.

Certain exemplary embodiments of the invention address the problem of prediction of the link quality of multiple carriers in a multi-carrier wireless network. It is an aim of certain exemplary embodiments to achieve a better trade-off (i.e. an improved, advantageous, useful balance) between the accuracy of prediction, the amount of carrier switching, and the complexity of prediction and its consequent power, time and memory consumption when estimating link qualities.

In the description below, references made in the text and designated using the format "[#]" correspond to the following documents, the entire disclosure of each of which is hereby incorporated in this specification by reference:

[1] P. E. Mogensen et al., "*Urban Area Radio Propagation Measurements at 955 and 1845 MHz for small and Micro Cells,*" GLOBECOM, 1991.

[2] M. Gudmundson, "*Correlation model for shadow fading in mobile radio systems,*" Electronic Letters, Vol. 27, No. 23, 7 Nov. 1991.

[3] M. Andersin, Zvi Rosberg, "*Time Variant Power Control in Cellular Networks,*" Royal Institute of Technology, Technical report, March 1996.

[4] H. L. Bertoni et al., "*UHF Propagation Prediction for Wireless Personal Communications,*" Proceedings of the IEEE, Vol. 82, No. 9, September 1994.

[5] P. Taaghol, R. Tafazolli, "*Correlation model for shadow fading in land-mobile satellite systems,*" Electronics Letters, Vol. 33, No. 15, 17 Jul. 1997.

[6] Y-H Choi, "*Mobility Management of IEEE 802.16e Networks,*" International Journal of Computer Science and Network Security, Vol. 8, No. 2, February 2008.

[7] LG Electronics Inc., "*Method for base station scanning of mobile terminal,*" International patent application No PCT/KR2005/003259, filing 1 Oct. 2005.

[8] A. Mourad, "*Method for estimating parameters necessary for accurate prediction of frequency band link quality in multi-band wireless networks,*" SERI patent proposal, July 2008 (internal document, unpublished).

[9] TELLA AB, "*Improvements in, or relating to, mobile radio telephony,*" International Patent Application, Number PCT/SE98/01157, filing date 16 Jun. 1998.

[10] IEEE 802.16e—2005 standard, "*Part 16: Air Interface for Fixed and Mobile Broadband Wireless Access Systems,*" February 2006.

FIG. 1 is a schematic representation of a carrier-time grid for link quality measurement and prediction during a scanning interval or a preliminary test measurement period or interval according to an exemplary embodiment of the present invention.

Referring to FIG. 1, the time interval over which the carrier-time grid spans is commonly referred to as the scanning interval. As illustrated, the grid is composed of a plurality of carrier-time bins (which may also be referred to as carrier-time boxes, subdivisions, segments, sectors, etc.). The measurement procedure is conducted on the carrier-time bins of type M, where a pilot signal is sent by a transmitter to a receiver for measurement purposes. The prediction procedure is conducted on carrier-time bins of type P, where no pilot signal is sent. The prediction relies on pilot signals sent on the carrier-time bins of type M. It will be appreciated that in conventional link quality estimation techniques, all bins were of type M, i.e. a measurement was made in each bin (or square, portion or segment) of the grid or array. In contrast, in exemplary embodiments of the invention, only some (i.e. not all) of the bins are type M.

In accordance with exemplary embodiments of the present invention, a problem being solved can be stated as follows: for a given density of bins of type M, find a suitable pattern for distributing the bins of type P and M across the carrier-time grid, and propose an appropriate method for prediction achieving an improved trade-off between accuracy and complexity.

Denoting by K the number of carriers, and N the number of time units in the scanning interval, a measurement density (i.e. density of bins of type M) is set equal to 1/K, which is the density of measurements that would have to be made if there was to be a measurement on a single carrier only in every time slot during the scanning interval with only bins of type M at each time unit.

In accordance with exemplary embodiments of the present invention, information available on shadowing correlation across the different carrier frequencies is utilized in addition to the time correlation information.

The information available on shadowing correlation in certain exemplary embodiments is obtained from actual measurements. Additionally, or alternatively, the correlation information may be obtained from the literature, and in this respect we refer to reference [1] which indicates that the fading on one carrier frequency corresponds very closely with that on another. Certain exemplary embodiments of the invention measure and use correlation information. This correlation can include information on carrier to carrier correlation (in other words how a variation in fading on one carrier correlates to the variation on another). The correlation information can also include information on the correlation of fading on a single carrier at different times (in other words how the fading at one time or time interval corresponds to the fading at another time or time interval).

In accordance with exemplary embodiments of the present invention, a number of solutions to the above-mentioned problem are provided, with corresponding measurement/prediction patterns and prediction techniques.

Figure 2:
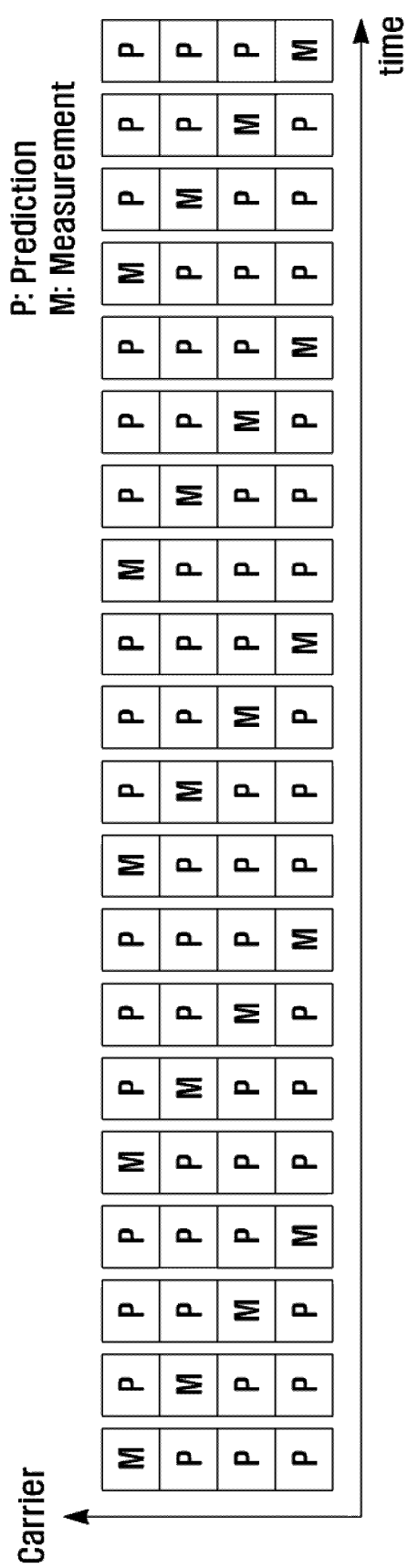
FIG. 2 illustrates an accuracy-oriented pattern of test measurements and predictions during a scanning interval in a method according to an exemplary embodiment of the present invention.

A first exemplary solution uses a measurement/prediction pattern as shown in FIG. 2.

FIG. 2 illustrates an accuracy-oriented pattern of test measurements and predictions during a scanning interval in a method according to an exemplary embodiment of the present invention.

Referring to FIG. 2, the majority of carrier-time bins are of type P, with test measurements being made in a minority of the bins. Just one test measurement is made in each time slot of the scanning interval. In a first block of measurements, K test measurements are made (and in this particular example K=4, but K of course may be a different number), each one being made in a respective one of the first K time slots, and each being made on a different one of the K carrier frequencies of the multi-carrier system. This measurement scheme is then essentially repeated along the scanning interval.

An aim of the pattern in FIG. 2 is to take full advantage of the shadowing carrier correlation between different carrier frequencies so that a high accuracy of prediction can be achieved over all the carriers. The technique does, however, involve a high number of carriers equal to N−1, where N is the length of the scanning interval.

Figure 3:
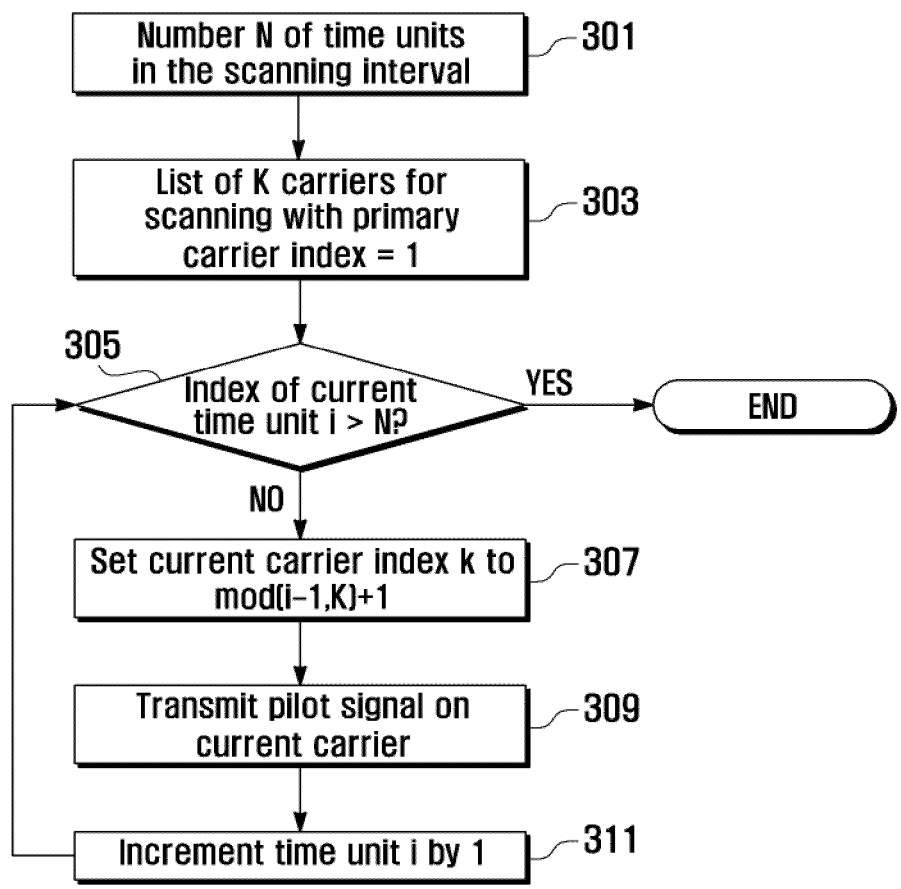
FIG. 3 is a flowchart illustrating a method for performing a pattern of test measurements according to an exemplary embodiment of the present invention.

FIG. 3 is a flowchart illustrating a method for performing a pattern of test measurements according to an exemplary embodiment of the present invention.

Referring to FIG. 3, in step 301, a number N of time units in the scanning interval is set. In step 303, a list of K carriers for scanning with primary carrier index is set to 1. In step 305, it is determined if an index of the current time unit i is greater than N. If it is determined in step 305 that the index of the current time unit i is greater than N, the process ends. On the other hand, if it is determined in step 305 that the index of the current time unit i is not greater than N, the current carrier index k is set to mod [i−1, K]+1 in step 307. In step 309, a pilot signal is transmitted on the current carrier. And, in step 311, the time unit i is incremented by 1.

From this pattern of measurements, values indicative of the predicted link qualities in each of the P-type bins are determined using a technique involving block-wise 2-D optimal Wiener filters. In this technique, each block of K diagonal bins M is processed separately, and the quality of the bins P inside the block is predicted (determined) from the K observations available at diagonal bins M. An advantage of this technique is that a high accuracy is achieved while reducing the complexity of the prediction determinations by reusing the same filters in each block of K diagonal bins M within the scanning interval.

In other words, a set of filters can be determined from the measurements made in the first block (together with correlation information obtained from preliminary measurements in certain exemplary embodiments). That determined set of filters can then be used to determine the predicted quality values for each of the P-type bins in the first block. That same set of determined filters can then be used to determine the predicted quality values in the P-type bins of the second block using the measurements made on the diagonals of the second block, and so on. In certain exemplary embodiments, a set of just $K^2-K$ filters is determined and used to determine expected quality values for each of the $K^2-K$ P-type bins of each block. In alternative exemplary embodiments, a set of $K^2$ filters is determined, and in addition to using those filters to determine the predicted values in the P-type bins, the filters can also be used to process (i.e. smooth) the quality values obtained from measurements in the M-type bins. The use of $K^2$ filters can thus provide improved accuracy, for example where measurement errors are significant.

Figure 4:
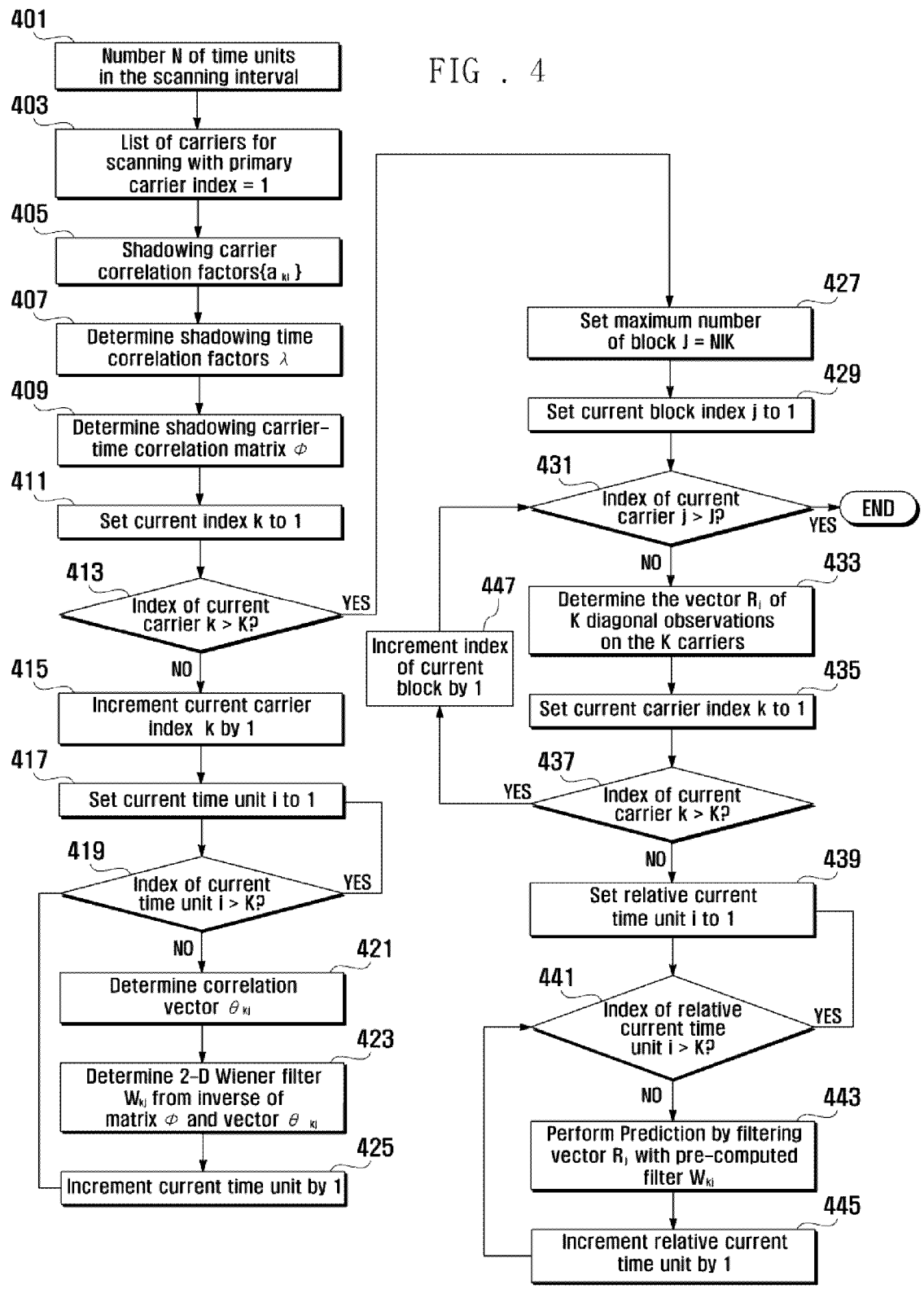
FIG. 4 is a flowchart illustrating a method for determining the predicted link qualities in the P-type carrier-time bins shown in FIG. 2 (it is a flow chart illustrating a block-wise 2-D Wiener prediction method) according to an exemplary embodiment of the present invention.
Figure 5:
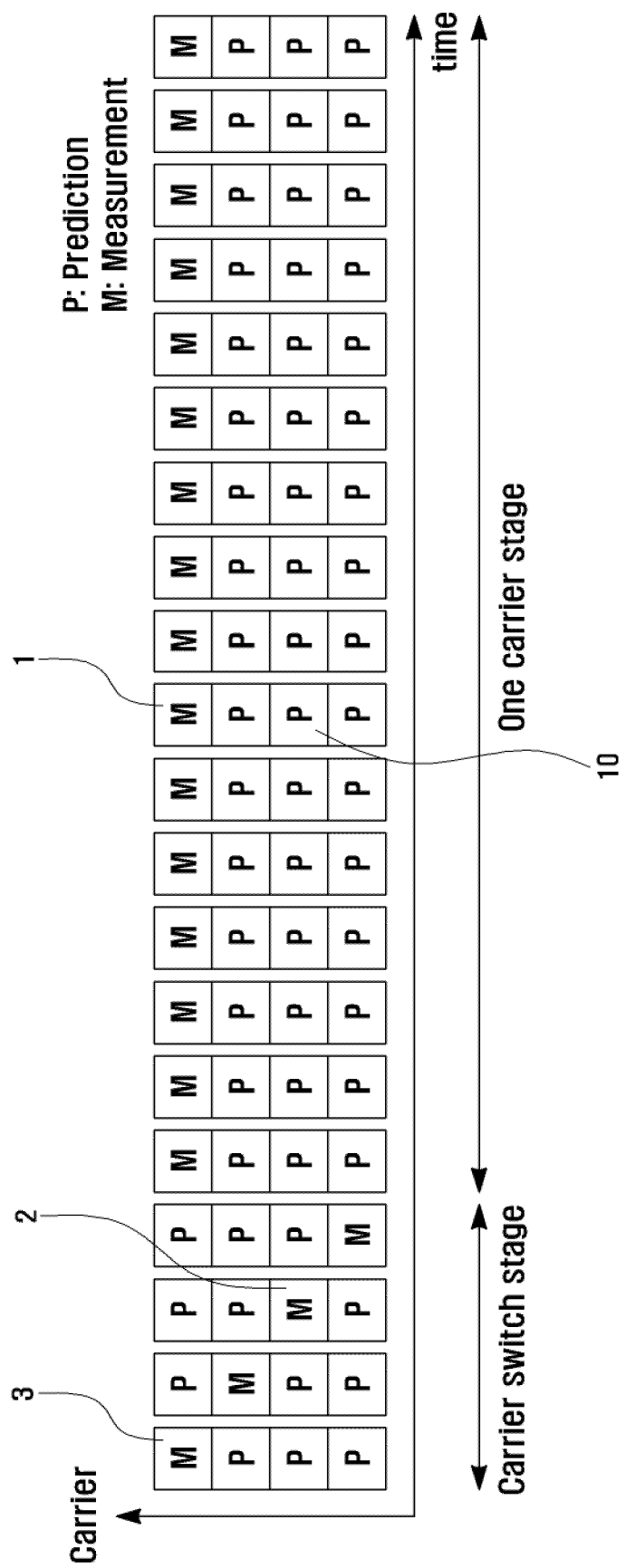
FIG. 5 illustrates a pattern of test measurements and link quality predictions in a scanning interval according to an exemplary embodiment of the present invention.

FIG. 4 is a flowchart illustrating a method for determining the predicted link qualities for use with the measurement pattern illustrated in FIG. 2. FIG. 5 illustrates a pattern of test measurements and link quality predictions in a scanning interval according to an exemplary embodiment of the present invention.

Referring to FIG. 4, in step 401 a number N of time units in the scanning interval is set. In step 403, a list of carriers for scanning with primary carrier index is set to 1. In step 405, the shadowing carrier correlation factors $\{a_{kl}\}$ are set and in step 407, the shadowing time correlation factors are determined. In step 409, the shadowing carrier-time correlation matrix is determined using the time correlation factors determined in step 407. In step 411, the current index k is set to 1. In step 413, it is determined if the index of current carrier k is greater than K. If it is determined in step 413 that the index of the current carrier k is not greater than K, the current carrier index k is incremented by 1 in step 415. In step 417, the current time unit i is set to 1. In step 419, it is determined if the index of the current time unit i is greater than K. If it is determined in step 419 that the index of the current time unit i is not greater than K, the correlation vector is determined in step 421. Alternatively, if it is determined in step 419 that the index of the current time unit i is greater than K, the process return to step 417 to set the current time unit i to 1 and the procedure continues. In step 423, the 2-D Wiener filter $W_{kj}$ is determined from the inverse of determined matrix and correlation vector. And in step 425, the current time unit is incremented by 1. Referring again to step 413, if is determined that the index of the current carrier k is greater than K, in step 427, the maximum number of block J is set to NIK. In step 429, the current block index j is set to 1. In step 431, it is determined if the index of current carrier j is greater than J. If it is determined in step 431 that the index of current carrier j is greater than J, the process ends. On the other hand, if it is determined in step 431 that the index of current carrier j is not greater than J, the vector Rj of K diagonal observations on the K carriers is determined in step 433. In step 435, the current carrier index k is set to 1. In step 437, it is determined if the index of current carrier k is greater than K. If it is determined in step 437 that the index of current carrier k is greater than K, the index of the current block is incremented by 1 in step 447 and the procedure returns to step 431. On the other hand, if it is determined in step 437 that the index of current carrier k is not greater than K, the relative current time unit i is set to 1 in step 439. In step 441, it is determined if the index of the relative current time unit i is greater than K. If it is determined that the relative current time unit i is greater than K, the process returns to step 439 to set the relative current time unit i to 1. On the other hand, if it is determined that the relative current time unit i is not greater than K, a prediction is performed by filtering the vector $R_j$ with pre-computed filter $W_{kj}$ In step 443. And, in step 445, the relative current time unit is incremented by 1.

As illustrated in FIG. 4, an exemplary embodiment providing a second solution to the above-mentioned problem targets a trade-off between accuracy and the amount of carrier switching in the scanning interval, and uses the prediction/measurement pattern shown in FIG. 5. The pattern solution defines two stages: an initial stage with carrier switch, where a pilot signal is sent once on a different respective carrier in each time slot of the initial stage to provide an initial group of test measurements, and a second stage, where pilot signals are only sent on a single (primary) carrier.

This measurement/prediction pattern is able to take advantage of the shadowing carrier correlation information that is available (e.g. from prior measurements) or take advantage of valid assumptions regarding carrier correlation, while minimizing the number of carrier switches (only K switches) and preserving the measurement density equal to 1/K.

Figure 6:
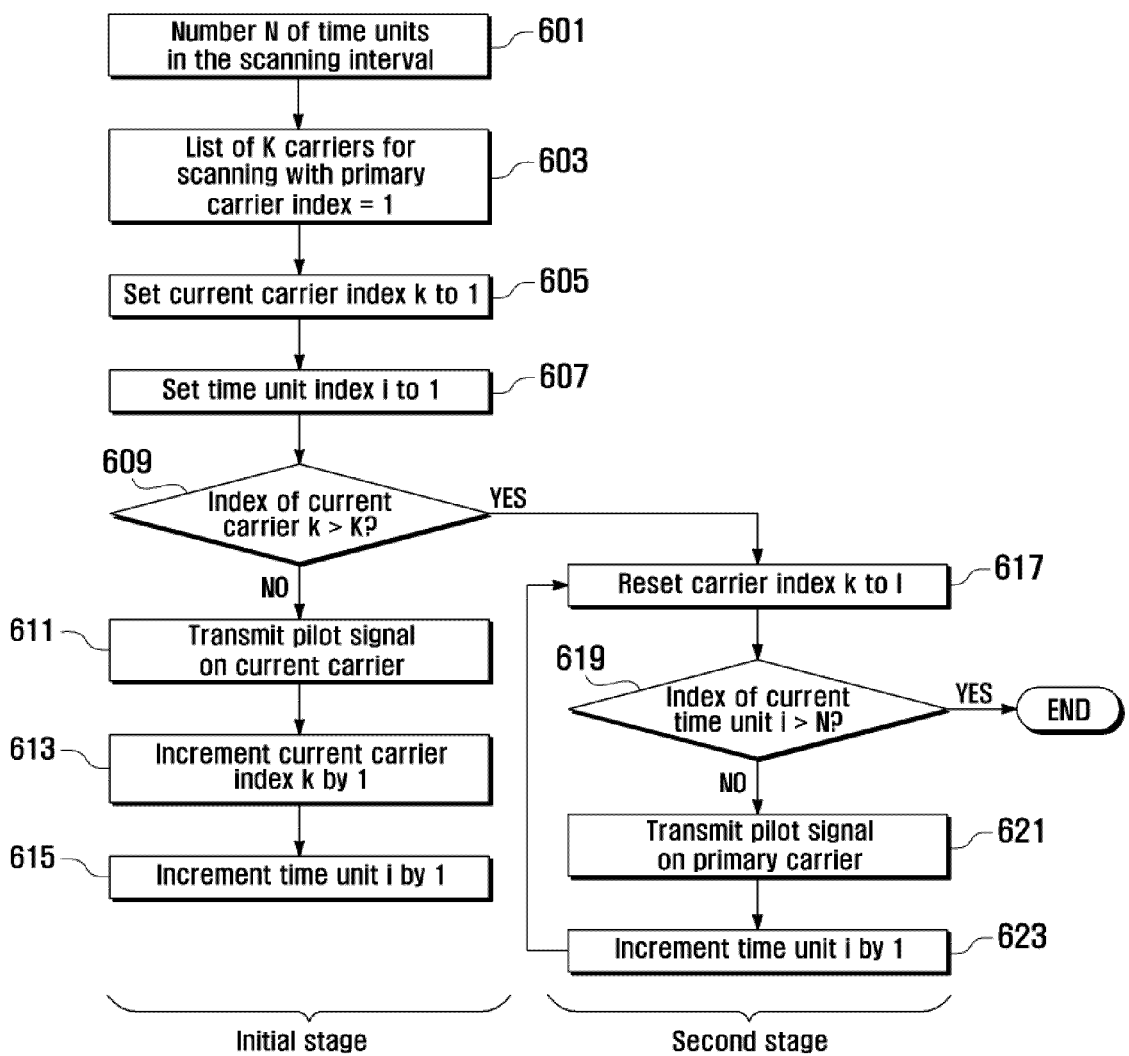
FIG. 6 is a flowchart illustrating a method for generating the accuracy/carrier switching tradeoff-oriented test measurement pattern in FIG. 5 according to an exemplary embodiment of the present invention.

FIG. 6 is a flowchart illustrating a method for generating the accuracy/carrier switching tradeoff-oriented test measurement pattern in FIG. 5, according to an exemplary embodiment of the present invention.

Referring to FIG. 6, the process includes a first or initial stage and a second stage. In the first stage, a number N of time units in the scanning interval is set in step 601 and a list of K carriers for scanning with primary carrier index is set to 1 in step 603. In step 605, the current carrier index k is set to 1 and in step 607, the time unit index i is set to 1. In step 609, it is determined if the index of the current carrier k is greater than K. If it is determined that the index of the current carrier k is not greater than K in step 609, a pilot signal is transmitted on the current carrier in step 611. In step 613, the current carrier index k is incremented by 1 and in step 615, the time unit i is incremented by 1 which completes the initial stage. On the other hand, if it is determined in step 609 that the index of the current carrier k is greater than K, the second stage is initiated with the resetting of the carrier index k to 1 in step 617. In step 619, it is determined if the index of the current time unit i is greater than N. If it is determined that the index of the current time unit i is greater than N, the process ends. However, if it is determined that the index of the current time unit i is not greater than N, a pilot signal is transmitted on a primary carrier in step 621 and the time unit i is incremented by 1 in step 623.

The results of the test measurements made according to the pattern of FIG. 5 can be used to determine values indicative of the predicted/expected quality of links in the P-type bins in a number of ways in different exemplary embodiments of the invention. These different determination methods may be described as prediction methods.

Figure 7:
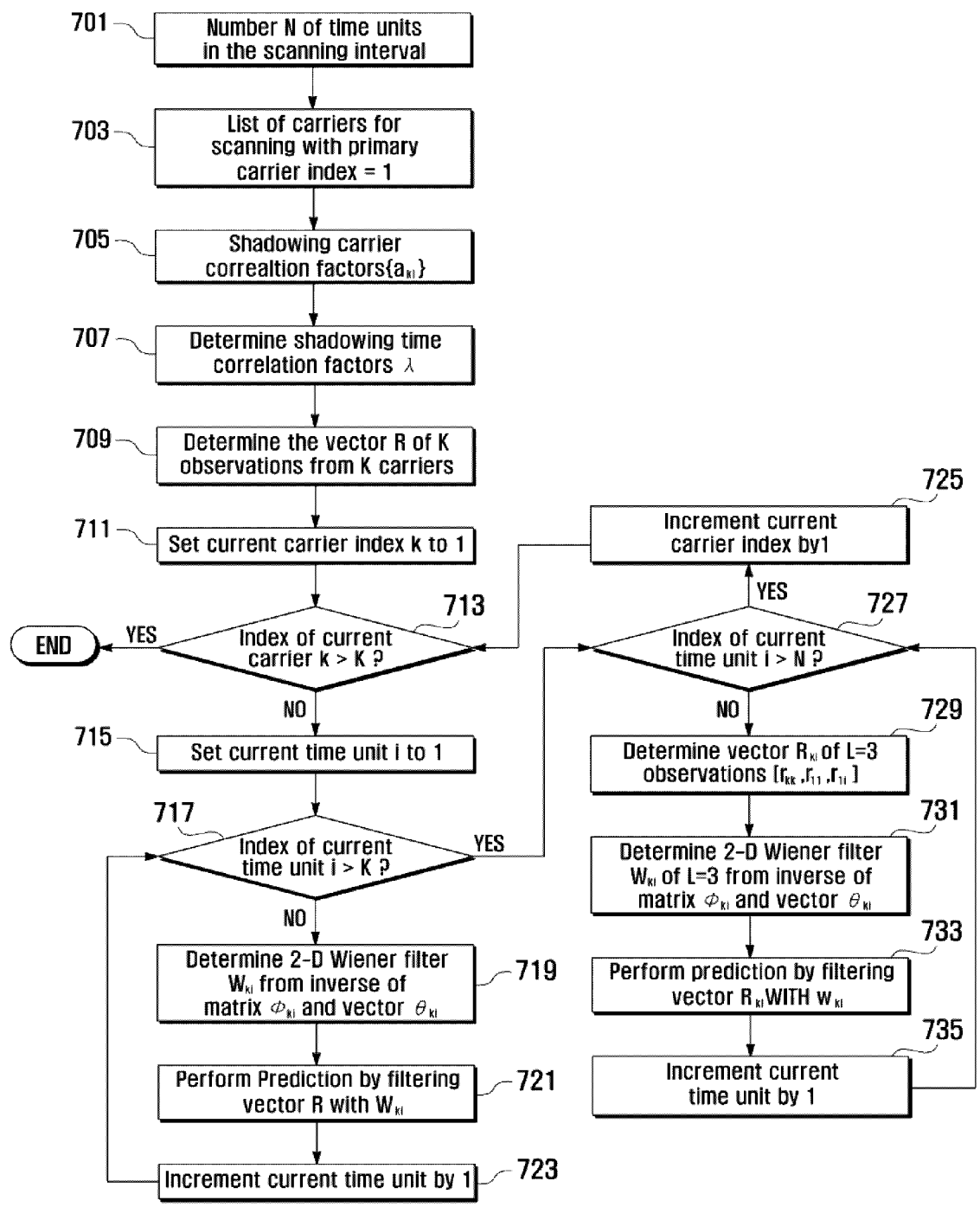
FIG. 7 is a flowchart illustrating a method of determining predicted quality values for the P-type carrier-time bins in FIG. 5 according to an exemplary embodiment of the present invention.

FIG. 7 is a flowchart illustrating a method of determining predicted quality values for the P-type carrier-time bins in FIG. 5 according to an exemplary embodiment of the present invention.

Referring to FIG. 7, a number N of time units in the scanning interval is set in step 701. In step 703, a list of carriers for scanning with primary carrier index is set to 1. In step 705, shadowing carrier correlation factors $\{a_{kl}\}$ are set and in step 707, the shadowing time correlation factors are determined. In step 709, the vector R of k observations from K carriers is determined and in step 711, the current carrier index k is set to 1. In step 713, it is determined if the index of the current carrier k is greater than K. If it is determined that the index of the current carrier k is greater than K, the process ends. On the other hand, if it is determined that the index of the current carrier k is not greater than K, the current time unit i is set to 1 in step 715. In step 717, it is determined if the index of the current time unit i is greater than K. If the index of the current time unit i is not greater than K, the 2-D Wiener filter $W_{ki}$ is determined in step 719. In step 721, prediction filtering is performed by filtering vector R with $W_{ki}$ and in step 723, the current time unit is increased by 1 after which the process returns to step 717. Referring again to step 717, if it is determined that the index of the current time unit i is greater than K, proceeding to step 727, it is determined if the index of the current time unit i is greater than N. If the index of the current time unit i is greater than N, the current carrier index is incremented by 1 in step 725 and the process returns to step 713 where the appropriate steps are again executed. On the other hand, if it is determined in step 727 that the index of the current time unit i is not greater than N, the vector $R_{ki}$, of length L=3 observations ($r_{kk}$, $r_{ll}$ and $r_{li}$) is determined in step 729. In step 731, the 2-D Wiener filter $W_{ki}$ is determined. In step 733, prediction filtering is performed by filtering vector R with $W_{ki}$ and in step 735, the current time unit is increased by 1.

In the method illustrated in FIG. 7, a filter (in this particular example a block-wise 2D Wiener filter of length K) is used to determine an expected quality value for each P-type bin of the initial stage, and then other filters (in particular, 2-D Wiener filters of length L=3) are used to determine expected quality values for the P-type bins of each secondary carrier at each time unit in the second stage. The number of filters needed in this first prediction method adds up to a total of $(K^2-K+(N-K)(K-1))$ filters.

It will be appreciated that although the number of filters needed in the carrier switch stage is $K^2-K$, a number $K^2$ of filters may be determined if the test measurements in the carrier switch stage are to be smoothed. In this first exemplary method, the value indicative of predicted link quality determined for each P-type bin of the carrier switch stage is determined using all K of the test measurements made during the carrier switch stage, each on a different respective carrier frequency and in a different respective time slot. In the second stage, a different determination or prediction method is used. The value of predicted link quality for each P-type bin in the second stage is determined from three test measurements, one measurement made on a different carrier frequency but at the same time or time slot as the P-type bin, one test measurement made on the same carrier frequency but in a different time slot to the P-type bin, and a further test measurement made on a different carrier frequency and in a different time slot from the P-type bin. This final test measurement in certain exemplary embodiments is a test measurement made on the primary carrier frequency in the initial stage. Looking at FIG. 5, one of the P-type bins in the second stage has been labeled with the reference numeral 10. According to this first prediction method a value indicative of a predicted quality of the link in P-type bin 10 is determined from the three test measurements labeled 1, 2 and 3 in FIG. 5.

It will be appreciated that the exemplary prediction method depicted in FIG. 7 involves a significant amount of processing.

In order to reduce the amount of processing (in other words, to reduce or avoid the complexity incurred by the matrix operations, in particular inversion and multiplication, needed in the prediction method in FIG. 7) certain exemplary embodiments of the invention utilize an alternative prediction method, which is less complex.

Figure 8:
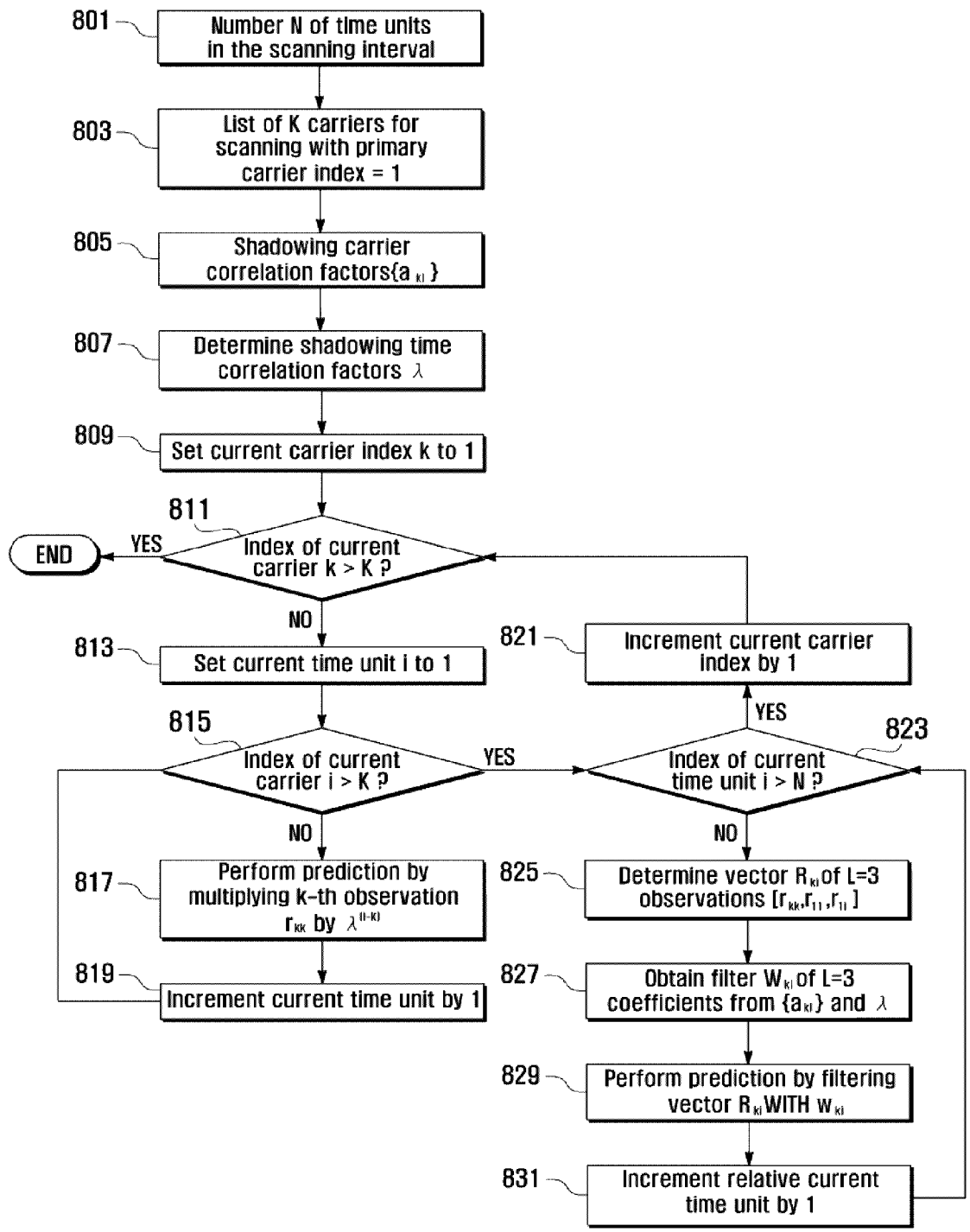
FIG. 8 illustrates a flowchart of a method for calculating predicted quality values for the P-type carrier-time bins in FIG. 5 according to an exemplary embodiment of the present invention.

FIG. 8 illustrates a flowchart of a method for calculating predicted quality values for the P-type carrier-time bins in FIG. 5 according to an exemplary embodiment of the present invention.

Referring to FIG. 8, in step 801 a number N of time units in the scanning interval is set. In step 803, a list of K carriers for scanning with primary carrier index is set to 1. In step 805, the shadowing carrier correlation factors $\{a_{kl}\}$ are set and in step 807, the shadowing time correlation factors are determined. In step 809, the current carrier index k is set to 1. In step 811, it is determined if the index of the current carrier k is greater than K. If it is determined that k is greater than K, the process is ended. On the other hand, if it is determined that k is not greater than K in step 811, the current time unit i is set to 1 in step 813. In step 815, it is determined if the index of the current carrier ii is greater than K. If it is determined that the index of ii is not greater than K, a prediction is performed in step 817 by multiplying the $k^{th}$ observation $r_{kk}$ by the applicable shadowing time correlation factor. In step 819, the current time unit is incremented by 1 and the process returns to step 815. Referring again to step 815, if it is determined that the index of the current carrier i is greater than K, it is determined in step 823 if the index of the current time unit i is greater than N. If the index of the current time unit ii is greater than N, the current carrier index is incremented by 1 in step 821 and the process returns to step 811. On the other hand, if it is determined in step 823 that the index of the current time unit i is not greater than N, the vector $R_{kl}$, of length L=3 observations ($r_{kk}$, $r_{ll}$ and $r_{li}$) is determined in step 825. In step 827, the filter $W_{lk}$ of L=3 coefficients from $\{a_{kl}\}$ and the corresponding shadowing time correlation factor is obtained. In step 829, prediction is performed by filtering vector $R_{kl}$ with $W_{ki}$ and in step 831, the current time unit is increased by 1.

The method illustrated in FIG. 8 relies on real-time simple computation of the filters without the need of any correlation matrix inversion or operation. The performance of the simplified method (in terms of prediction accuracy) has been shown (see below) to be very close to the first method, thus leading to a better trade-off between accuracy and complexity.

Further details of these exemplary first and second prediction methods, along with details of performance evaluations, are provided below.

Figure 9:
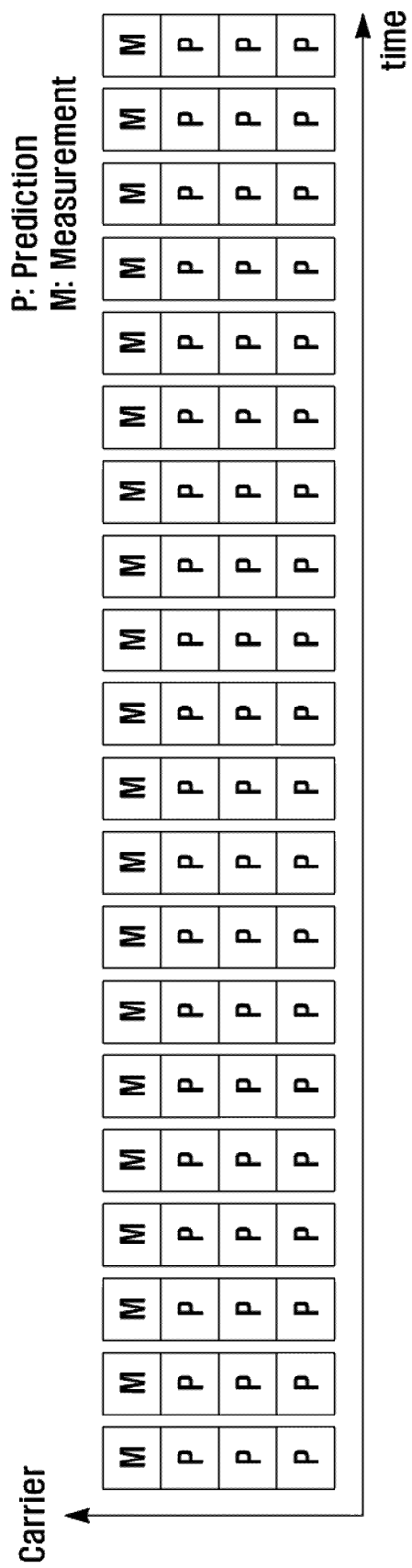
FIG. 9 illustrates a pattern of test measurements and link quality predictions in a scanning interval in an alternative method according to an exemplary embodiment of the present invention.

Another measurement/prediction pattern that may be used in accordance with exemplary embodiments of the present invention is illustrated in FIG. 9.

In this pattern, test measurements are made on just one of the carrier frequencies, but in each and every time slot of the scanning interval. From these measurements, predicted values are determined for the remaining carrier-time bins on the other three carrier frequencies in this example.

As no test measurements are made on three of the carriers, there is no information available from the test measurements in the scanning interval on correlation between shadow fading or equivalently path loss between different carrier frequencies. In order to determine the predicted values in the P-type bins, exemplary methods embodying the invention are able to use either correlation information obtained from preliminary measurements before the scanning interval that give direct information on correlation between carrier frequencies, or alternatively a correlation between carrier frequencies may be assumed. With regard to the second technique, it is disclosed in reference [1], the entire disclosure of which is hereby incorporated by reference, that in certain circumstances there is a very strong correlation between shadow fading on one carrier frequency and shadow fading on another carrier frequency. In reference [1], signals were simultaneously transmitted on two different carrier frequencies and the corresponding strengths of received signals were measured using a receiver capable of also receiving the two different carrier frequency signals simultaneously. The receiver was moved along a test path with respect to the transmitting location, and the received signal strengths at each location were measured. From these results, values of respective path loss on each of the carrier frequencies were able to be determined at each position. The results were analyzed statistically and it was found that there was a very strong correlation between the variation in path loss with position on one carrier frequency and the other. Such measurement techniques may also be used in exemplary embodiments of the present invention in order to provide correlation information that can be used in conjunction with the results of test measurements during the scanning interval in order to determine values indicative of predicted or expected qualities of links in P-type carrier-time bins. Thus, in certain cases there will be a very strong correlation between path loss variation on one carrier frequency and another, and so in certain exemplary embodiments of the invention an assumption can be made that shadow fading on one carrier frequency will simply follow the variation on another frequency on which test measurements are made. Thus, from the measurement scheme shown in FIG. 9, the observed variation in received signal strength, or path loss with time for the carrier frequency on which test measurements are made can be assumed to take place on the other carrier frequencies. This information can thus be used to determine the expected values in the P-type bins of the measurement pattern in FIG. 9.

Thus, although the test measurements from FIG. 9 can be used with correlation information previously obtained by measurements, it can also be used with a prediction solution that simply assumes high correlation between shadowing (i.e. shadow fading) on different carriers.

In other words, in accordance with exemplary embodiments of the present invention, the prediction method used in conjunction with the measurement pattern in FIG. 9 does not take into account correlation information available from measurements on the shadowing across different carriers. Instead, it relies on the high correlation observed (for example in reference [1]) to assume simply the same shadowing on different carriers.

An advantage of the measurement pattern in FIG. 9 is that there is no carrier switching during the scanning interval, while preserving the measurement density 1/K.

Certain prediction solutions that may be used with the measurement pattern of FIG. 9 do not take into account any carrier correlation measurements. Rather, they simply assume the same shadowing on all carriers based on their high correlation. As will be demonstrated below, since there are no bins of type M (measurement) on the secondary carriers, even an optimal MMSE filter does not account for the shadowing carrier correlation since it is one dimension (1D) and has therefore low accuracy, compared with prediction techniques based on preliminary measurements that provide correlation information and test measurements made on more than one carrier frequency.

Thus, exemplary embodiments of the invention using results of preliminary measurements on shadowing correlation together with test measurements on a plurality of carriers can provide the following advantages over techniques that simply assume correlation and measure on just one carrier frequency:

1. A much higher prediction accuracy thanks to the use of carrier shadowing correlation in addition to the time shadowing correlation.

2. Preserves the same density of measurement bins.

3. The filtering method illustrated in FIG. 8 achieves a good trade-off between accuracy, complexity, and memory storage as compared to the method in FIG. 7.

It will be appreciated that certain exemplary methods embodying the invention incur a minimum increase in the carrier switching, compared with the more simple measurement scheme shown in FIG. 9, in order to benefit from the shadowing carrier correlation information available from measurements. Certain exemplary embodiments are therefore able to provide a better trade-off between the number of carrier switches, accuracy of prediction, and complexity/memory storage/power consumption, while preserving the density of measurement bins.

Aspects and features of exemplary embodiments of the invention will now be described in more detail.

Certain exemplary embodiments utilize a Link Quality Model, in which the link quality is defined as the local-mean received Signal to Noise Ratio (SNR) given by:

$$Q_f = \frac{S_f}{N_f} \quad (1)$$

Where $S_f$ is the received local-mean Received Signal Strength (RSS) and $N_f$ is the received noise signal power across the entire bandwidth of frequency band f.

The noise power is expressed as:

$$N_f = NFkTB_f \quad (2)$$

Where NF is the noise figure at the receiver, k is Boltzman's constant, T is the equivalent temperature of receiver noise, and $B_f$ is the bandwidth of frequency band f.

From (2), it is seen that the dependence of $N_f$ on frequency band f is only through $B_f$, which is constant and known to the receiver.

Thus, the ratio between the received noise powers on two different frequency bands $f_1$ and $f_2$ is constant over time and known to the receiver. It is given by the ratio between their associated bandwidths as shown hereafter:

$$\frac{N_{f_2}}{N_{f_1}} = \frac{B_{f_2}}{B_{f_1}} \quad (3)$$

The received local-mean signal strength $S_f$ at time instant t is given by:

$$S_f(t) = P(t)G_f(t) \quad (4)$$

Where P(t) is the power transmitted by the transmitter on the pilots used for measurements of the link quality at time instant t. This power is known to the receiver and it is usually invariant with respect to time and frequency bands.

The second term in (4) $G_f(t)$ denotes the propagation link gain. This gain gathers the two large-scale fading components, namely distance-dependent path gain $GD_f(t)$ and shadow fading $H_f(t)$. It can be written as:

$$G_f(t) = GD_f(t)H_f(t) \quad (5)$$

The distance-dependent component in dB scale $gd_f(t)$ is modeled as:

$$gd_f(t) = K_f - \alpha_f d(t) \quad (6)$$

Where $K_f$ is a propagation constant specific to the frequency band f and environment, $\alpha_f$ is the exponential decay factor with respect to the distance, and d(t) is the distance in dB(km) scale between transmitter and receiver at time instant t.

The exponential decay factor $\alpha_f$ is specific to the environment and it usually takes values in the range between 3.5 and 4. The dependence of $\alpha_f$ on frequency band f is very weak as shown in reference [1].

From (7), the distance-dependent component $gd_{f_2}(t)$ on frequency band $f_2$ can be deduced from that on frequency band $f_1$ as follows:

$$gd_{f_2}(t) = \left(K_{f_2} - \frac{\alpha_{f_2}}{\alpha_{f_1}}K_{f_1}\right) + \frac{\alpha_{f_2}}{\alpha_{f_1}} gd_{f_1}(t) \approx (K_{f_2} - K_{f_1}) + gd_{f_1}(t) \quad (7)$$

The shadowing component follows a log-normal distribution so that in dB scale, the time-variant process $h_f(t)$ follows a Gaussian distribution of zero mean and standard deviation $\sigma_f$ specific to the frequency band f.

The dependence of $\sigma_f$ on frequency band f is weak, between 0.5 to 1 dB when the frequency doubles as shown in references [1] and [4].

For the time-correlation of the shadowing $h_f(t)$, an exponential model validated by reference [2] is commonly used. This model does not take into account the frequency-correlation, it only models the time-correlation for given frequency f.

The model is given by reference [3].

$$h(t_0 + t) = h(t_0)\lambda + n(t)(1 - \lambda^2)^{\frac{1}{2}};$$
$$\lambda = \exp\left(\frac{-ut}{2}\right)$$
(8)

where n(t) is a Gaussian random variable with zero mean and same standard deviation as h(t), and it is independent with $gs(t_0)$. The parameter u is expressed as (see reference [3]):

$$u = \frac{2v}{\xi}$$
(9)

where v is the speed of the mobile, and $\xi$ is the effective correlation distance of the shadow fading. This latter variable is defined as the distance at which the normalized correlation (i.e. normalized by variance $\sigma^2$) falls to exp(−1) (see reference [5]). This effective distance is in the order of few tens of meters (e.g. 20 m, 50 m) and it is found to be only dependent on the environment.

In order to extend the time-correlation model in (8) to account for the frequency correlation, we use the results provided by reference [1].

Considering the parameter $\xi$, the dependence of $\xi$ on the frequency is very weak especially as shown in reference [1] even when taking the time correlation of the shadowing without normalization, i.e. keeping $\sigma_f$, the dependence of the time correlation pattern on the frequency was found very weak.

Thus, we can extend (8) to account for the frequency dependence as:

$$h_f(t_0 + t) = h_f(t_0)\lambda + n_f(t)(1 - \lambda^2)^{\frac{1}{2}}$$
(10)

The frequency correlation is characterized by the correlation coefficient as:

$$E\{h_{f_i}(t)h_{f_j}(t)\} = a_{ij} = \rho_{ij}\sigma_i\sigma_j$$
(11)

In the above equation $\sigma_i$ represents the standard deviation of shadow fading on i-th carrier frequency $f_i$; and can be determined from measurements of received signal strength versus time or position on i-th carrier frequency band using techniques as described in reference [1] or indeed other techniques that will be apparent to the person skilled in the relevant art.

The quantity $\rho_{ij}$, is a correlation coefficient, indicative of a correlation between the shadow fading on i-th carrier frequency $f_i$ and j-th carrier frequency $f_j$. Again, the different correlation coefficient for $f_i$ and $f_j$, can be derived (determined) from measurements made on received signal strength versus time or position of the carrier frequencies $f_i$ and $f_j$ using techniques as described in reference [1] or indeed other techniques that will be apparent to the person skilled in the relevant art.

The frequency correlation matrix of the shadowing can be expressed as:

$$E\{h(t)h^T(t)\} = \Sigma R \Sigma$$
(12)

where h(t) is the column vector of N shadowing variables $h_{f_i}(t)$ associated with the N frequency bands $f_i$ available for use. The matrices $\Sigma$ and R are defined hereafter:

$$\Sigma = \begin{bmatrix} \sigma_1 & 0 & \cdots & 0 \\ 0 & \ddots & \ddots & \vdots \\ \vdots & \ddots & \ddots & 0 \\ 0 & \cdots & 0 & \sigma_N \end{bmatrix};$$
(13)

$$R = \begin{bmatrix} 1 & \rho_{12} & \cdots & \rho_{1N} \\ \rho_{12} & \ddots & \ddots & \vdots \\ \vdots & \ddots & \ddots & \rho_{N-1N} \\ \rho_{1N} & \cdots & \rho_{N-1N} & 1 \end{bmatrix}$$

where each of the sigma ($\sigma$) and rho ($\rho$) values have been determined from preliminary measurements, involving the transmission of signals on the respective carrier frequencies and the measurement of the strength of corresponding received signals, as described above.

The shadowing vector h(t) can then be written as:

$$h(t_0 + t) = h(t_0)\lambda + n(t)(1 - \lambda^2)^{\frac{1}{2}}$$
(14)

where unlike (8) in reference [3], the vector n(t) is correlated as given below:

$$n(t) = \frac{ER^{\frac{1}{2}}}{Q}w(t)$$
(15)

where w(t) is a vector with i.i.d. Gaussian random variable of zero mean and standard deviation equal to 1. The $R^{1/2}$ is defined such as $R^{1/2}R^{1/2}=R$, and it exists since R is a definite positive matrix.

Referring again to the measurement pattern shown in FIG. 9, the authors in reference [1] investigated the correlation in the slow fading between two different frequency bands, namely 955 and 1845 MHz. They concluded that there was a very high correlation between the two frequencies for the exponential decay factor, shadowing standard deviation, and shadowing time correlation pattern. Based on those conclusions, we propose a prediction model for calculating values of expected link qualities which assumes as constant the time-variant shadowing correlation over the two different carriers.

The mean square error on carrier-time bin (k,n) for the solution using this prediction model can be found as:

$$MSE_{kn} = a_{kk} + a_{ll} - 2a_{lk}$$
(16)

The MSE in (16) is time invariant. Where $a_{kl}$ is the shadowing correlation coefficient between carrier k and carrier l as given in (11).

An alternative to this prediction model, which can also be used in exemplary embodiments of the invention, is proposed as follows. It comprises applying an optimal 1D Wiener filter which minimizes the mean square error. A 1D Wiener filter can be obtained as:

$$W_k^T = \theta_k^T \Phi^{-1}$$
(17)

where the observation correlation matrix $\Phi$ is given by:

$$\Phi = E\{R_n R_n^T\}; \theta_k^T = E\{h_k(n) R_n^T\} \quad (18)$$

where $R_n$ is the vector of L observations (measurements) used for filtering the bin (k,n), and L is the filter length. In case of error-free measurement, $r_{kn}$ is simply given by the shadowing component $h_{kn}$.

Assuming error-free measurements, the quantities in (18) reduce to:

$$\Phi = a_{11} \begin{bmatrix} 1 & \lambda & \cdots & \lambda^{L-1} \\ \lambda & 1 & \ddots & \vdots \\ \vdots & \ddots & \ddots & \lambda \\ \lambda^{L-1} & \cdots & \lambda & 1 \end{bmatrix}; \quad (19)$$

$$\theta_k^T = a_{kk} \Phi_{\frac{L+1}{2}}$$

From the above equations, we can easily find the optimal filter equal to:

$$W_k^T = \frac{a_{kk}}{a_{11}} [0 \ \ldots \ 1 \ \ldots \ 0] \quad (20)$$

which reflects the failure to account for any shadowing correlation across the carriers in the filtering process. The mean square error of the prediction (i.e. the mean square error in the determined value indicative of predicted link quality for each P-type carrier-time bin) is obtained as:

$$MSE_{kn} = a_{kk} - \frac{a_{1k}^2}{a_{kk}} = (1 - \rho_{1k}^2)\sigma_k^2 \quad (20)$$

Similarly to (16), the mean square in (21) keeps constant over time but less than that in (16). The improvement in accuracy thanks to 1D Wiener filter as compared to (16) is insignificant, or at least small. Nevertheless, in case of measurement errors, the gain achieved by 1D Wiener filter would be higher since Wiener filter aims at ensuring Minimum Mean Square Error (MMSE) even with additive noise error affecting the measured observations.

Thus, a conclusion here is that the prediction accuracy for link quality estimations based on the measurement pattern shown in FIG. 9 is lower bounded by equation (21).

Bearing in mind this limitation when using the measurement/prediction scheme of FIG. 9, as mentioned above, certain exemplary embodiments employ a different measurement and prediction scheme (or pattern), as shown in FIG. 2. Further details of this so-called "Maximum Carrier Switch Pattern" and associated prediction solutions are as follows.

The proposed maximum carrier switch pattern is depicted in FIG. 2.

One proposed prediction solution is block-wise 2D Wiener filtering. At each block of K diagonal bins of type M, the following vector of observations is used for prediction:

$$R = [r_{11} \ldots r_{kk} \ldots r_{KK}] \quad (22)$$

Each carrier-time bin (k,n) in the block has its corresponding Wiener filter obtained as:

$$W_{kn}^T = \theta_{kn}^T \Phi^{-1} \quad (23)$$

Assuming error-free measurement, the quantities in (23) follow as:

$$\Phi = \begin{bmatrix} a_{11} & a_{12}\lambda & \cdots & a_{1K}\lambda^{K-1} \\ a_{12}\lambda & 1 & \ddots & \vdots \\ \vdots & \ddots & \ddots & a_{1K-1}\lambda \\ a_{1K}\lambda^{K-1} & \cdots & a_{1K-1}\lambda & 1 \end{bmatrix}; \quad (24)$$

$$\theta_{kn}^T = [a_{1K}\lambda^{(n-1)} \ \ldots \ a_{kK}\lambda^{(n-K)}]$$

The mean square error can then be found as:

$$MSE_{kn} = a_{kk} - \theta_{kn}^T \Phi^{-1} \theta_{kn} \quad (25)$$

Thus, for the prediction according to the exemplary proposed solution, $K^2-K$ filters need to be pre-determined and stored, and mapped to the ($K^2-K$) carrier-time bins of type P.

It is worth noting here that in case of measurement errors, $K^2$ filters have to be pre-determined and applied to the corresponding $K^2$ components in each block.

Also as mentioned above, alternative exemplary embodiments of the invention employ a measurement pattern as shown in FIG. 5. This may be described as an accuracy/carrier switch tradeoff oriented pattern.

Certain exemplary embodiments employ two different prediction solutions (or determination methods) in order to determine values indicative of predicted link qualities in the P-type bins from the pattern of measurements shown in FIG. 5.

The flowchart of a first one of these prediction solutions is given in FIG. 7. In the initial stage, the same ($K^2-K$) filters are applied as in previous prediction method employed together with the test measurement pattern of FIG. 2. In the second stage, however, we propose the following observation vector of length L=3 for prediction on bin (k,n), k>1, n>K:

$$R_{kn} = [r_{kk} r_{ll} r_{ln}]^T \quad (26)$$

The optimal 2D Wiener filter associated with observation vector $R_{kn}$ in (26) is obtained as:

$$W_{kn}^T = \theta_{kn}^T \Phi_{kn}^{-1} \quad (27)$$

With the following quantities when assuming error-free observations:

$$\Phi_{kn} = \begin{bmatrix} a_{kk} & a_{1k}\lambda^{(k-1)} & a_{1k}\lambda^{(n-k)} \\ a_{1k}\lambda^{(k-1)} & a_{11} & a_{11}\lambda^{(n-1)} \\ a_{1k}\lambda^{(n-k)} & a_{11}\lambda^{(n-1)} & a_{11} \end{bmatrix}; \quad (28)$$

$$\theta_{kn}^T = [a_{kk}\lambda^{(n-k)} \ a_{1k}\lambda^{(n-1)} \ a_{1k}]$$

The mean square error (i.e. the mean square error in the determined value indicative of predicted link quality for each P-type carrier-time bin) can then be found as:

$$MSE_{kn} = a_{kk} - \theta_{kn}^T \Phi^{-1} \theta_{kn} \quad (29)$$

The MMSE filter in (27) and MSE in (28) are therefore specific to each bin (k,n).

The flowchart of a second one of these prediction solutions, and which targets better trade-off between accuracy, complexity, and storage is given in FIG. 8.

In the initial stage, the estimates on the ($K^2-K$) carrier-time bins of type P are obtained by simply performing the following multiplication:

$$\hat{h}_{kn} = r_{kk}\lambda^{(n-k)} \quad (30)$$

In the second stage, we propose the following observation vector of length L=3 for prediction on bin (k,n), k>1, n>K:

$$R_{kn} = [\hat{h}_{kl} r_{ll} r_{ln}]^T \quad (31)$$

The linear predictor is derived from the following equations:

$$h_{kn} = h_{k1}\lambda^{(n-1)} + n_{kn}(1-\lambda^{2(n-1)})^{\frac{1}{2}} \quad (32)$$

$$h_{1n} = h_{11}\lambda^{(n-1)} + n_{1n}(1-\lambda^{2(n-1)})^{\frac{1}{2}}$$

With $h_{kl}$ being accessible through estimation at the initial stage. We then consider the problem of determining the second term $n_{kn}$ from $n_{ln}$. We propose the predictor given by:

$$\hat{n}_{kn} = C_{lk} n_{ln} \quad (33)$$

where $C_{lk}$ is a constant specific to the couple of carriers (k,l). The optimal value of $C_{lk}$ is determined according to MMSE criterion as:

$$C_{lk} = \arg\min E\{(\hat{n}_{kn} - n_{kn})^2\} \quad (34)$$

The solution of (34) is found as:

$$C_{1k} = \frac{a_{1k}}{a_{11}} = \rho_{1k}\frac{\sigma_k}{\sigma_1} \quad (35)$$

The sub-optimal filter for carrier-time bin (k,n) can then be determined as:

$$W_{kn}^T = [\lambda^{(n-1)}; -C_{lk}\lambda^{(n-1)}; C_{lk}] \quad (36)$$

The receiver therefore only needs to know shadowing carrier correlation factor $C_{lk}$, and shadowing time correlation factor $\lambda$. It has then to compute easily the filter coefficients as given in (36) for each carrier-time bin (k,n).

Thanks to the proposed predictor, we save the computation operations (matrix multiplication and inversion) of the 2D Wiener filter given in (27).

The mean square error for the filter given in (36) can then be found as:

$$MSE_{kn} = a_{kk}(1-\lambda^{2(k-1)})\lambda^{2(n-1)} + a_{kk}\left(1 - \frac{a_{1k}^2}{a_{11}a_{kk}}\right)(1-\lambda^{2(n-1)}) \quad (37)$$

The simple analytical form in (36) of the mean square error is another advantage of this proposed exemplary solution as compared to the optimal MMSE filter solution. It enables easier control of the performance. This is used in further exemplary embodiments, as described below.

A performance evaluation of certain exemplary embodiments will now be described.

In order to assess the relative performance of various exemplary embodiments of the invention we considered the same context as in reference [1] for the sake of convenience. Therefore, two carrier frequencies $f_p$=900 MHz and $f_s$=1845 MHz are considered (in other words, performances were evaluated for a two-carrier system, using the various test measurement patterns and associated prediction methods (determination techniques) described above, but of course modified appropriately to account for the fact that there were just two available carrier frequencies, not four). Hata propagation model is considered for $f_p$=900 MHz, and modified Hata for $f_s$=1845 MHz as recommended by reference [1]. All simulation parameters are summarized in Table 1 below.

TABLE 1

| Parameter | Value for $f_p$ | | Value for $f_s$ | |
|---|---|---|---|---|
| Carrier frequency f | 900 | MHz | 1845 | MHz |
| Bandwidth B | 5 | MHz | 5 | MHz |
| Transmission power P | 43 | dBm | 43 | dBm |
| Noise figure NF | 5 | dB | 5 | dB |
| Thermal noise density kT | −174 | dBm/Hz | −174 | dBm/Hz |
| BS height $h_{BS}$ | 30 | m | 30 | m |
| MS height $h_{MS}$ | 1.5 | m | 1.5 | m |
| Propagation constant K | −126.40 | dB | −136.56 | dB |
| Distance decay factor α | 3.52 | | 3.52 | |
| Mobile speed v | 30 | kmh | 30 | kmh |
| Effective shadowing correlation distance $\xi$ | 20 | m | 20 | m |
| Shadowing standard deviation σ | 8 | dB | 8.2 | dB |
| Shadowing correlation coefficient ρ | 0.91 | | 0.91 | |

Figure 10:
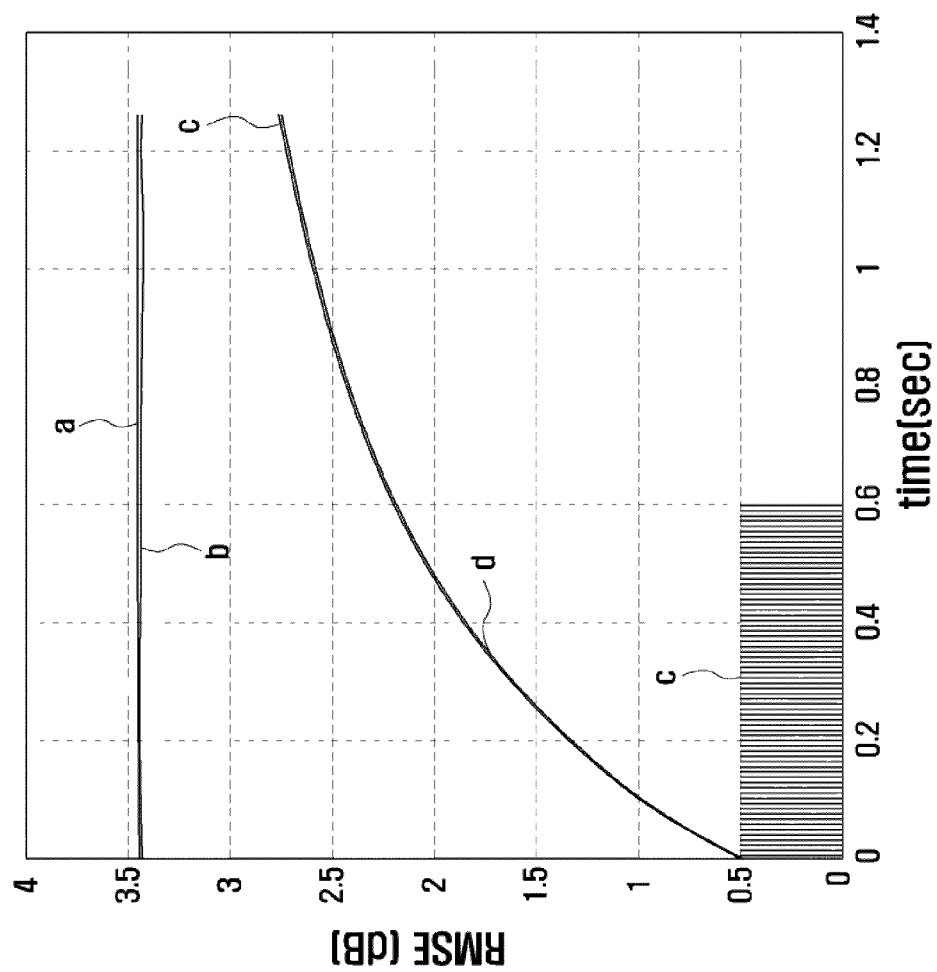
FIG. 10 is a plot of the route mean squared error in the predicted quality of the P-type carrier-time bins as a function of time according to an exemplary embodiment of the present invention.

FIG. 10 depicts the RMSE (i.e. the RMSE in the determined value indicative of predicted link quality in a carrier-time bin) as a function of time (in other words as a function of the time between the carrier-time bin and the beginning of the scanning interval) for the various exemplary embodiments. The time interval is considered ranging from 0 to 1.275 sec with a regular step of 5 ms. This corresponds to the maximum scanning interval duration and frame duration in the IEEE 802.16e standard [10].

Data (a) shows the performance of an exemplary embodiment using a measurement pattern of the type shown in FIG. 9 and a prediction method that assumes the same shadowing on one band (carrier frequency) as the other. The error is relatively high and substantially constant.

Data (b) shows the performance of an exemplary embodiment using a measurement pattern of the type shown in FIG. 9 and a prediction method using a filter (in particular, the 1-D MMSE (L=4)) of the type described above. Again, the error is relatively high and substantially constant.

Data (c) shows the performance of an exemplary embodiment using a measurement pattern of the type shown in FIG. 2 and a prediction method using filters, of the type as shown and described with reference to FIG. 4. Here, the error is very low and remains low throughout the scanning interval—this is to be expected, because the measurement pattern repeatedly makes measurements on each of the carrier frequencies (the block of measurements on all carrier frequencies is repeated, with no gaps in between), hence errors are not allowed to grow.

Data (d) shows the performance of an exemplary embodiment using a measurement pattern of the type shown in FIG. 5 and a prediction method using filters in both the first and second stages, of the type as shown and described with reference to FIG. 7. The error begins at a very low level, but then increases with time (expected, as one moves further away from the initial stage in which test measurements are made on all of the carrier frequencies). However, the error at all times remains significantly below those associated with data sets (a) and (b).

Data (e) shows the performance of an exemplary embodiment using a measurement pattern of the type shown in FIG. 5 and a simplified prediction method, using filters in just the second stage, of the type as shown and described with reference to FIG. 8. The performance of this exemplary embodiment is very close to that of the exemplary embodiment yielding data (d). Again, the error begins at a very low level, but then increases with time (expected, as one moves further away from the initial stage in which test measurements are made on all of the carrier frequencies). However, the error at all times remains significantly below those associated with data sets (a) and (b).

Referring to FIG. 10, exemplary embodiments using correlation information obtained from preliminary measurements in conjunction with test measurements in the scanning interval are able to provide a significant gain in accuracy over exemplary embodiments where the shadowing on the secondary band is simply assumed to be the same as on the primary band.

Referring to FIG. 10, in terms of accuracy, all proposed exemplary embodiments making use of the shadowing carrier correlation in addition to the time correlation, greatly outperform the other exemplary embodiments.

In terms of accuracy, the best of the above-described exemplary embodiments is the one yielding data set (c). However, this technique does involve a large amount of carrier switching during the scanning interval.

The second best of the above exemplary embodiments in terms of accuracy is the one yielding data set (d). This exemplary embodiment trades accuracy against the number of carrier switches. However, the technique still involves the complexity of real-time matrix operations to determine the variable Wiener filters.

The best of the above exemplary embodiments in terms of a balance between accuracy, number of carrier switches, and complexity of prediction processing, is the one yielding data set (e). This exemplary embodiment achieves very close performance to that of the more complex solution yielding data (d) at much lower complexity. In addition, this exemplary embodiment allows for a simple closed form of the MSE, which can be used for controlling the accuracy, as will be described below in relation to further exemplary embodiments.

Further embodiments will now be described with reference to FIGS. 11 to 19. Certain of these exemplary embodiments aim to provide methods for frequency band link quality prediction using frequency band correlation and a refreshment mechanism in multi-band wireless networks.

These exemplary embodiments of the invention again apply to the radio interface of multi-carrier wireless networks and other systems. Examples of such networks/systems are: dual band GSM, multi-carrier UMTS, 3GPP LTE, IEEE802.15, WiMAX IEEE802.16, etc. Again however, this is not to be construed as limiting the application of the present invention to these listed systems, but rather an exemplary list for convenience of explanation.

One of the problems addressed by certain of these exemplary embodiments is that of predicting the link quality on a secondary frequency carrier or carriers from the link quality measured on a primary frequency carrier in multi-carrier wireless networks. Certain solutions (exemplary embodiments) proposed above have been shown to achieve significant gain in accuracy as compared to other exemplary embodiments. Nevertheless, exemplary embodiments such as those yielding data sets (e) and (d) above suffer from the drawback of error propagation over time, and the prediction accuracy decreases when the time increases. Exemplary embodiments of the invention described below aim to overcome, at least partially, this drawback, thanks to the introduction of a novel refreshment mechanism. It will also be appreciated that exemplary embodiments such as that yielding data set (c) address the problem of trading-off (i.e. obtaining a balance between) accuracy and the density of measurement pilots and number of carrier switches.

Exemplary embodiments of the invention described below rely on the results of prediction methods described above in relation to other exemplary embodiments. For such methods, we have shown the feasibility of prediction of the link quality from one frequency carrier to another and have proposed solutions (prediction or calculation techniques) achieving high accuracy of prediction. The accuracy of prediction for different exemplary embodiments is shown (see FIG. 10) to vary with respect to the pattern of measurement pilots, filtering method, and time instant when the link quality is to be predicted.

Two main pattern solutions are proposed above, the measurement/prediction patterns being shown in FIGS. 2 and 5. Each pattern has pros and cons in terms of accuracy, number of carrier switches, and filtering implementation complexity.

The exemplary embodiments of the invention described below deal with two problems associated with the two solutions proposed above (in relation to FIGS. 2 and 5).

A first of these problems, which may be termed Problem 1, associated with Pattern 1 (the measurement/prediction pattern shown in FIG. 2) can be described as how to achieve a better trade-off between the measurement pilots density (and thus number of carrier switches) and accuracy of prediction.

Problem 1 considers the accuracy-oriented solution proposed above, with the maximum carrier switching pattern, as depicted in FIG. 2. As shown above, with reference to FIGS. 3-10, the maximum carrier switching solution achieves very high accuracy. Nevertheless, it requires a high (maximum) number of switches across (between) the carriers.

The problem we address here is to reduce the density of measurement pilots, and thus number of carrier switches, while ensuring an accuracy of prediction above a certain tolerable level.

Figure 11:
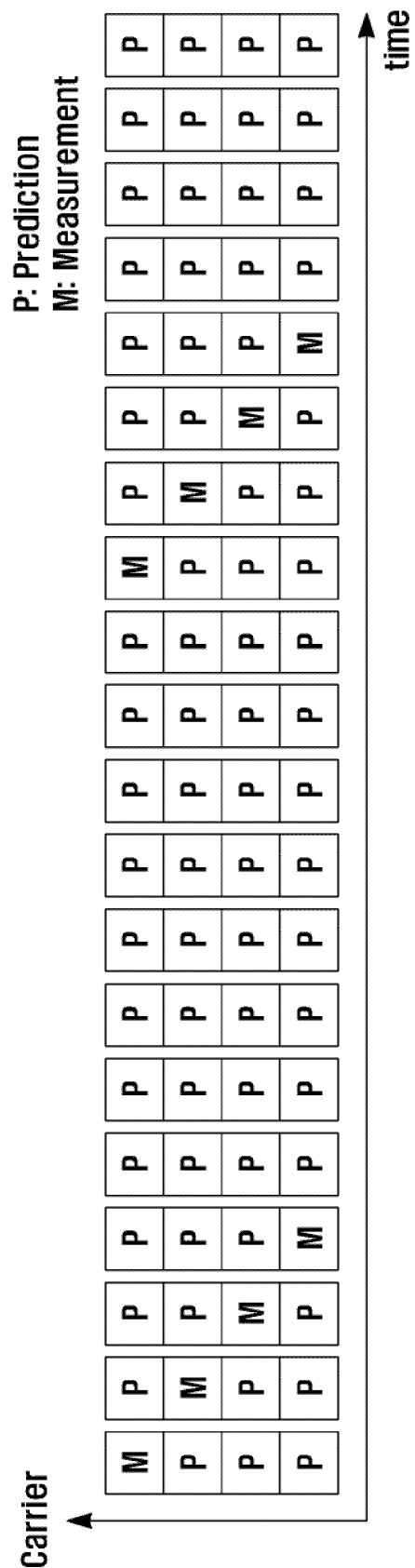
FIG. 11 illustrates a pattern of test measurements and link quality predictions over a scanning interval in an alternative method according to an exemplary embodiment of the present invention.

FIG. 11 illustrates a pattern of test measurements and link quality predictions over a scanning interval in an alternative method according to an exemplary embodiment of the present invention.

Referring to FIG. 11, the block of measurement pilots (type M) does not repeat immediately after the first measurement block (and indeed may not be systematic), in contrast to the scheme shown in FIG. 2. This obviously results in a reduced pilot-density (fewer measurements in the scanning interval) and therefore fewer carrier switches, but at the expense of prediction accuracy degradation.

A question addressed by certain exemplary embodiments is, when using a measurement scheme generally as shown in FIG. 11, with an interval of no test measurements between measurement blocks, how to determine when to send the next block of measurement pilots, and how to proceed for the prediction of the link quality (i.e. how to determine the link quality values for the P-bins from the measurements) over the carrier-time bins.

Figure 12:
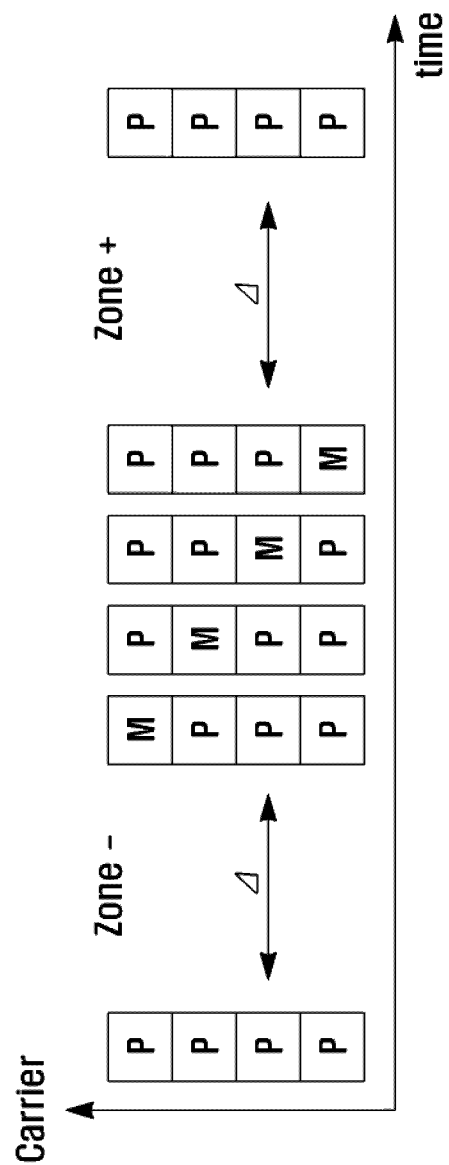
FIG. 12 illustrates a plurality of P-type carrier-time bins on the left and right hand sides of a measurement block of the scanning interval in a method according to an exemplary embodiment of the present invention.

For the prediction problem, we consider the portions of the scanning interval shown in FIG. 12.

FIG. 12 illustrates a plurality of P-type carrier-time bins on the left and right hand sides of a measurement block of the scanning interval in a method according to an exemplary embodiment of the present invention.

Referring to FIG. 12, it is seen that within the measurement block, the optimal solution (in terms of best accuracy) is to use 2-D MMSE filters (as described above). For the carrier-time bins on the left and right hand sides (Zone− and Zone+, respectively), the following filters are derived from the filters within the measurement block:

$$W_{k\Delta}^{+T} = \lambda^\Delta W_{kK}^T; \quad W_{k\Delta}^{-T} = \lambda^\Delta W_{k1}^T \qquad (100)$$

As shown in above, there is no need to determine the filters for outside the measurement block zone, they can be simply derived from the filters computed for the measurement block zone.

The MSE at time Δ from the measurement zone can then be obtained as:

$$MSE_{k\Delta}^{+} = a_{kk} - \lambda^{2\Delta}\alpha_k^{+}; \alpha_k^{+} = \theta_{kK}^T \Phi^{-1} \theta_{kK}$$

$$MSE_{k\Delta}^{-} = a_{kk} - \lambda^{2\Delta}\alpha_k^{-}; \alpha_k^{-} = \theta_{kl}^T \Phi^{-1} \theta_{kl} \quad (200)$$

Figure 13:
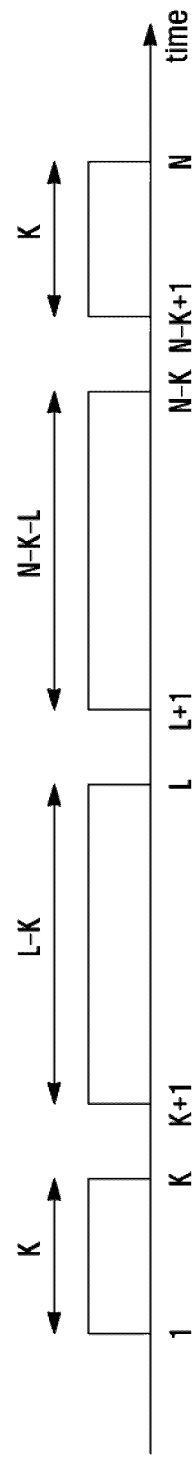
FIG. 13 illustrates a time distribution between two measurement block zones according to an exemplary embodiment of the present invention.

Moving now to the problem of how frequently a measurement block zone needs to be transmitted while keeping the accuracy (of determined values of predicted link quality) above a certain tolerable level, we consider FIG. 13.

FIG. 13 illustrates a time distribution between two measurement block zones according to an exemplary embodiment of the present invention.

Referring to FIG. 13, the time between two measurement blocks (which may also be described as a "refreshment time") can therefore be found as:

$$T = (N_r - 2K)dt \quad (300)$$

We therefore consider the problem of determining the refreshment parameter $N_r$ in a way to keep the RMSE for prediction of the link quality below a given threshold.

A solution to this problem of determining the refreshment parameter is as follows. The refreshment parameter $N_r$ is determined as the optimal solution for an optimization problem of a cost (utility) function to be defined.

Generally, this can be written as:

$$N_r^* = \underset{N}{\mathrm{argmax}}(U(MSE_{k1}, \ldots, MSE_{kN_r}) \leq \xi) \quad (400)$$

Where ξ denotes a given threshold, and U(.) is the utility function having a one-to-one mapping to the refreshment parameter $N_r$.

As shown in (500) below, the utility function U(.) can be decomposed into two components, a mapping component $U_m(.)$, and a compression component $U_c(.)$.

$$U(MSE_{k1}, \ldots, MSE_{kN}) = U_m(\tilde{MSE}_N); \tilde{MSE}_N = U_c(MSE_{k1}, \ldots, MSE_{kN_r}) \quad (500)$$

The compression function $U_c(.)$ compresses the vector of N MSE values $\{MSE_{kn}\}$ into a scalar effective MSE value $\tilde{MSE}_N$. The mapping function $U_m(.)$ has a one-to-one mapping between the refreshment parameter $N_r$ and effective MSE value $\tilde{MSE}_{N_r}$.

The functions $U_m(.)$ and $U_c(.)$ are defined, and it will be apparent to someone skilled in the relevant art how to define these functions. They can be determined from analytical derivation and/or through simulation and calibration processes that will be apparent to the skilled person.

Knowing the compression $U_c(.)$ and mapping $U_m(.)$, a procedure to determine the values $MSE_{kn}$ needs then to be set up in order to determine the refreshment parameter $N_r$ from (400). In the zone of a measurement block, the MSE performance can be obtained from equation (25) above. For the zones on the left and right of measurement block zone, the MSE values are given in (200) above. Thus, in order to determine MSE inputs, the following factors are needed (see equation (24) above):

1. Shadowing time-correlation parameter λ.
2. Shadowing frequency-correlation coefficients $\{a_{kl}\}$.

Signal to Noise Ratio on the measurement carrier-time bins (SNR), a term which appears in the correlation matrix Φ (see equation (24) above) in case the observations on carrier-time bins of type M are not free of noise or errors.

Figure 15:
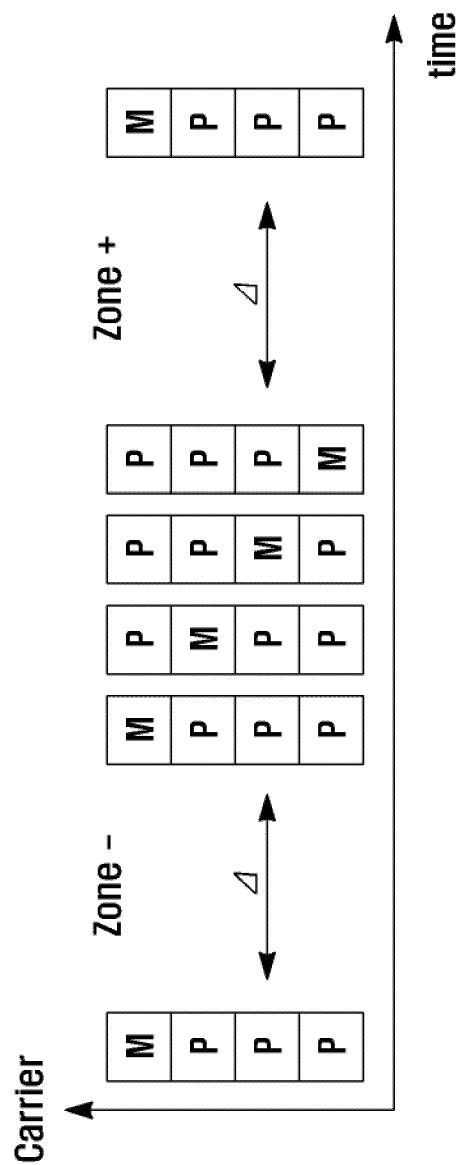
FIG. 15 illustrates a plurality of measurement and prediction-type carrier-time bins on left and right hand sides of a measurement block according to an exemplary embodiment of the present invention.

A second of these problems, which may be termed Problem 2, associated with Pattern 2 (the measurement/prediction pattern shown in FIG. 5) can be described as how to achieve a better trade-off between the accuracy of prediction and number of carrier switches for a measurement/prediction scheme based on that shown in FIG. 5, and repeated in FIG. 15.

As described above with reference to FIGS. 3 to 10, the accuracy of prediction based on a measurement scheme as shown in FIG. 5 decreases exponentially as long as the time increases, because of lower correlation with the measurement pilots at the carrier switch stage. The problem addressed here is to increase the average accuracy of prediction above a certain tolerable level by allowing more than one carrier switch stage, as shown in FIG. 14.

Figure 14:
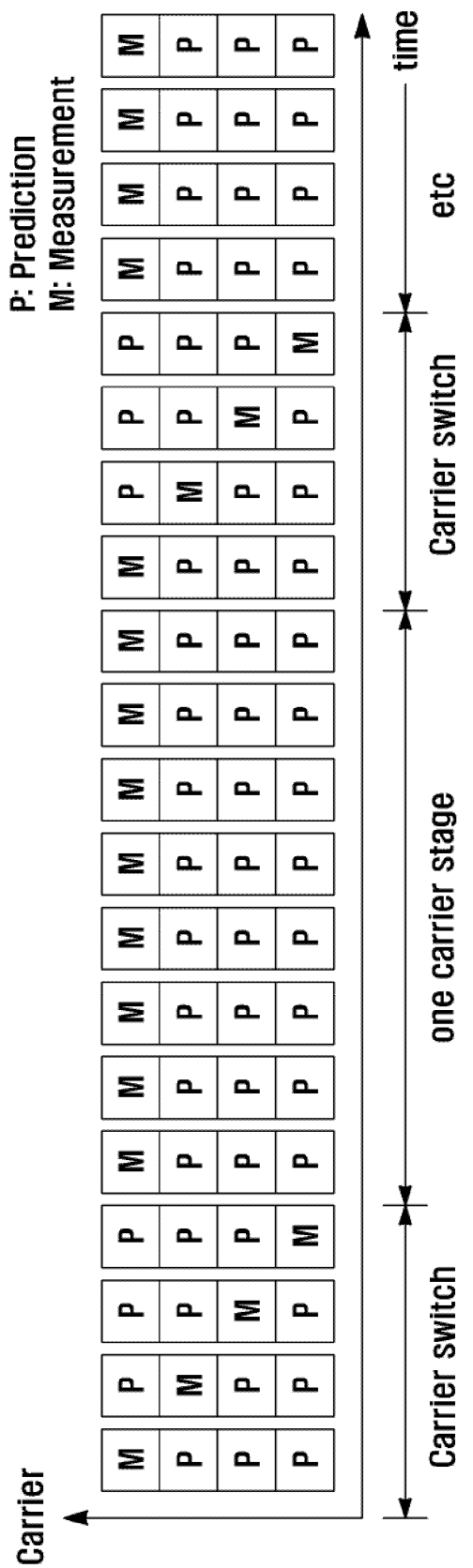
FIG. 14 illustrates a pattern of measurement and prediction-type carrier-time bins in a scanning interval according to an exemplary embodiment of the present invention.

FIG. 14 illustrates a pattern of measurement and prediction-type carrier-time bins in a scanning interval according to an exemplary embodiment of the present invention.

Referring to FIG. 14, a measurement/prediction pattern (pattern solution) is illustrated that addresses Problem 2. As we can see, the carrier switch stage repeats after a certain period of time, which may be described as a refreshment time.

Similarly to Problem 1 above, a further question addressed by exemplary embodiments of the invention is to determine when to send the block of measurement pilots (carrier switch block) (in other words, how long or short to make the intermediate "one-carrier" stage or stages to maintain accuracy above a certain threshold), and how to proceed for the prediction of the link quality (how to determine link qualities from the measurements) over the carrier-time bins.

For the prediction problem, we consider the measurement/prediction scheme or arrangement as shown in FIG. 15.

FIG. 15 illustrates a plurality of measurement and prediction-type carrier-time bins on left and right hand sides of a measurement block according to an exemplary embodiment of the present invention.

Referring to FIG. 15 and without loss of generality, we set to 1 the time index of the first symbol in the measurement block zone considered.

Within the measurement block, the filtering operation is given in (30) from above as:

$$\hat{h}_{kn} = r_{kk} \lambda^{(n-k)} \quad (600)$$

where $r_{kk}$ represents the measurement observation on k-th diagonal bin of type M.

The MSE values in the measurement block zone are obtained as follows:

$$MSE_{kn} = a_{kk}(1 - \lambda^{2(n-k)})\mathrm{sign}(n-k) \quad (700)$$

In the zone + (n>K) and zone − (n<1) respectively on the right and left hand sides of the measurement block, the following simple filtering is proposed from above:

$$\hat{h}_{kn} = W_{kn}^T R_{kn}$$

$$W_{kn}^T = [\lambda^{(n-1)}; -C_{lk}\lambda^{(n-1)}; C_{lk}]; R_{kn}^T = [\hat{h}_{kl}; r_{ll}; r_{ln}] \quad (800)$$

The MSE values are found as follows:

$$MSE_{kn} = \quad (900)$$

$$a_{kk}\left(\frac{1}{\lambda^{2(k-1)}} - 1\right)\lambda^{2(n-k)} + a_{kk}\left(1 - \frac{a_{1k}^2}{a_{11}a_{kk}}\right)(1 - \lambda^{2(n-k)})\mathrm{sign}(n-k)$$

It is important to note the lengths of zone + and zone − are not necessarily equal, since the MSE from (900) is not symmetric. From FIG. 13, we determine the length parameter L according to the following criterion:

$$MSE_{kL}^+ = MSE_{kL+1}^- \qquad (1000)$$

which yields the following expression of parameter L:

$$L = \left\lceil \frac{1}{2\log(\lambda)} \log\left( \frac{2\beta_2}{\frac{(\beta_2 - \beta_1)}{\lambda^2} + \frac{(\beta_2 + \beta_1)}{\lambda^{2(N-K)}}} \right) \right\rceil \qquad (1100)$$

where $\beta_1$ and $\beta_2$ are given from (900) as:

$$\beta_1 = a_{kk}\left(\frac{1}{\lambda^{2(k-1)}} - 1\right); \quad \beta_2 = a_{kk}\left(1 - \frac{a_{1k}^2}{a_{11}a_{kk}}\right) \qquad (1200)$$

Performance evaluation of these exemplary embodiments will now be described.

We first choose the compression function $U_c(.)$ being the average of the Root Mean Square Error (RMSE) values in dB over the time interval depicted in FIG. 13. Thus, we have:

$$R\tilde{M}SE_{N_r} = \frac{1}{N_r} \sum_{n=1}^{N_r} RMSE_{kn} \qquad (1300)$$

Figure 16:
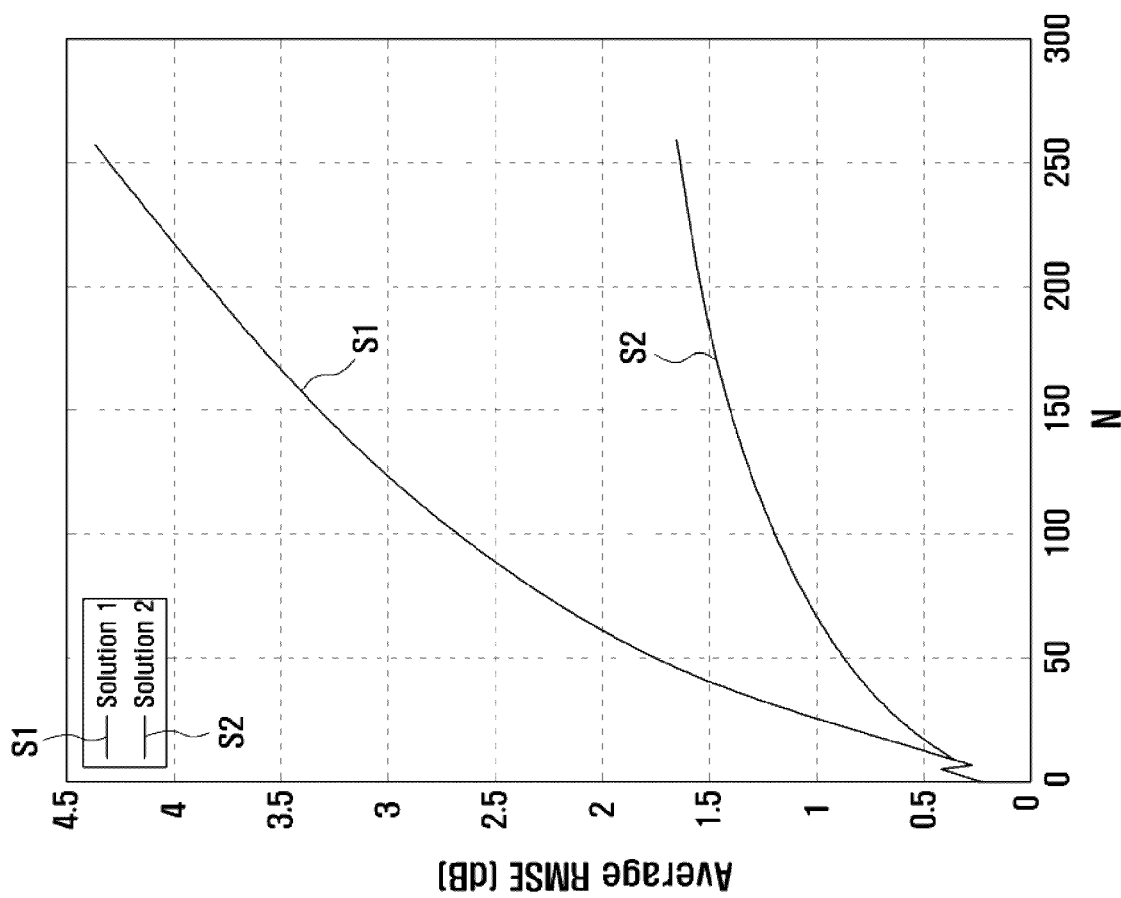
FIG. 16 is a plot of the average route mean squared error in predicted quality value versus refreshment interval length N with a mobile speed of 30 km/hour corresponding to two different methods according to an exemplary embodiment of the present invention.

The mapping functions associated with patterns 1 and 2 are depicted in FIG. 16 below.

FIG. 16 is a plot of the average RMSE in predicted quality value versus refreshment interval length N with a mobile speed of 30 km/hour corresponding to two different methods according to an exemplary embodiment of the present invention.

In order to assess the performance of the proposed solutions (exemplary embodiments), we consider the same context as above for the sake of convenience, since all measurement parameters are provided there and in reference [1]. The simulation parameters are summarized in table 1 above.

The following additional parameters are considered in the sequel for performance evaluation.

TABLE 2

Simulation parameters.

| Parameter | Value |
| --- | --- |
| Scanning time resolution | 5 ms |
| Scanning interval length $N_{scan}$ | 256 |
| Threshold γ | 1 dB, 2 dB, 3 dB |
| Mobile speed v | 30 kmh |

Referring to FIG. 16, the average RMSE versus the refreshment interval length $N_r$ with a mobile speed equal to 30 kmh is depicted. The curves are illustrated for both solutions 1 and 2, and each represents the mapping function $U_m(.)$ for each solution. Solution 1 of course corresponds to a measurement/prediction pattern of the type shown in FIG. 11, and solution 2 corresponds to a measurement/prediction pattern of the type shown in FIG. 14.

From FIG. 16, we can deduce for each solution the value of $N_r$ that provides an average RMSE less than 1 dB, 2 dB, and 3 dB, respectively (in other words, how short to make the refreshment interval in order to keep the errors below the respective thresholds). The results are summarized in table 3 below.

TABLE 3

Values of $N_r$ for average RMSE less than given threshold.

| Value of $N_r$ | Average RMSE < 1 dB | Average RMSE < 2 dB | Average RMSE < 3 dB |
| --- | --- | --- | --- |
| Pattern 1 | 24 | 64 | 128 |
| Pattern 2 | 72 | 256 | 256 |

Figure 17:
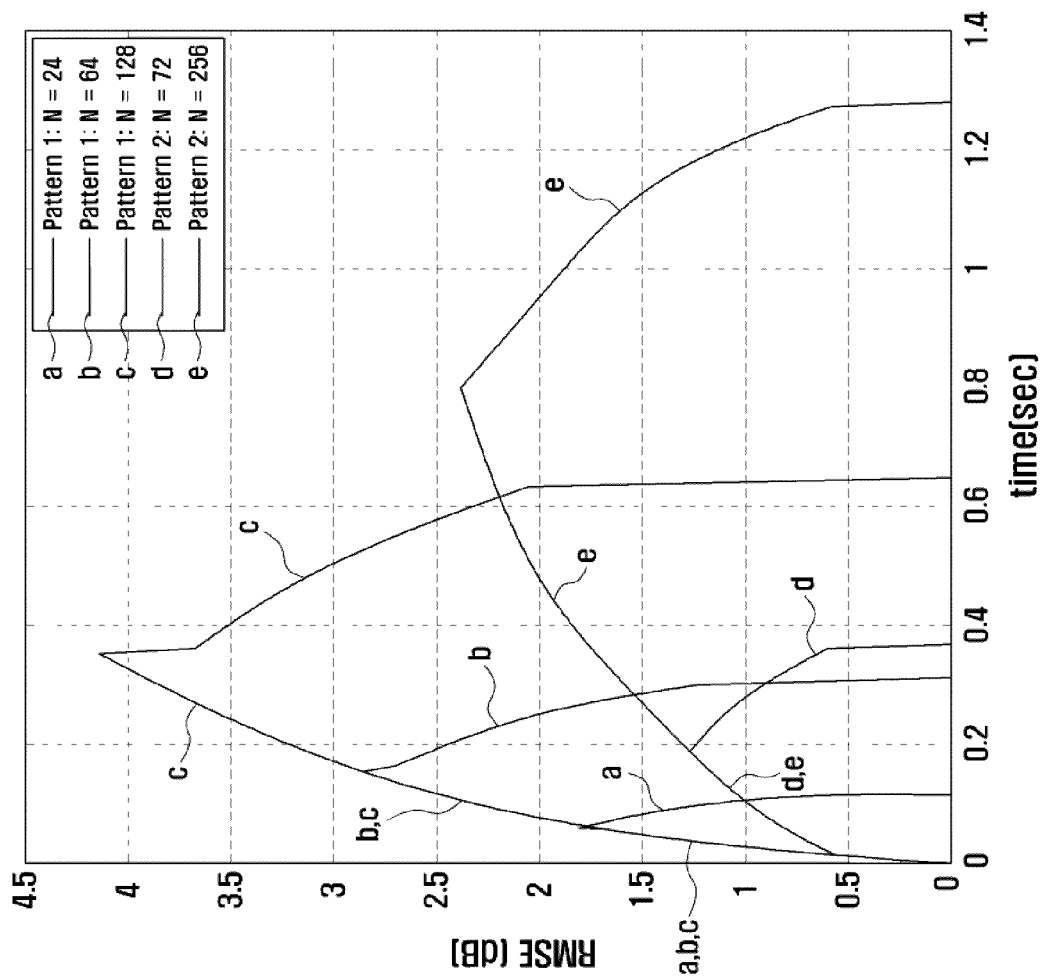
FIG. 17 is a plot of the route mean squared error in predicted quality value as a function of time for different link quality estimation methods and for different values of N according to an exemplary embodiment of the present invention.

FIG. 17 is a plot of the RMSE in predicted quality value as a function of time for different link quality estimation methods and for different values of N according to an exemplary embodiment of the present invention.

Referring to FIG. 17, the time variation of the RMSE for patterns 1 and 2 with the values of $N_r$ taken from table 3 is illustrated (i.e. it illustrates how the RMSE as a function of time is affected by refreshment at the different refreshment rates, corresponding to different refreshment intervals). In general terms, refreshment at the appropriate time prevents errors from increasing above the respective predetermined thresholds. Appropriate refreshment keeps accuracy above a predetermined threshold or thresholds.

From table 3, we can deduce the number of measurement blocks within the scanning interval. This is done following the steps depicted in FIG. 18.

FIG. 18 illustrates a method for determining the number and indexes of measurement blocks within the scanning interval according to an exemplary embodiment of the present invention.

Referring to FIG. 18, N is determined using table 3 and L is determined using equation (1100). The variable q is determined as [Nscan/N] and the variable r is determined as mod [Nscan, N]. Next, it is determined if r is greater than L−K. If it is determined that r is greater than L−K, the number of refresh is set to q=1 and the refresh index is set to [1, . . . , a, N]. If it is determined that r is not greater than L−K, the number of refresh is set to q and the refresh index is set to [1, . . . , q].

Table 4 gives the performance with refreshment as proposed in these exemplary embodiments of the invention.

Table 5 gives the reference performance of patterns 1 and 2 (from FIGS. 2 and 5) as proposed above for the purpose of comparison.

TABLE 4

Performance of patterns 1 and 2 with refreshment.

| Performance metric | Average RMSE < 1 dB | Average RMSE < 2 dB | Average RMSE < 3 dB |
| --- | --- | --- | --- |
| Pattern 1 - With refreshment | | | |
| Number of measurement blocks | 11 | 4 | 2 |
| Density of pilots | 4.3% | 1.6% | 0.8% |
| Number of carrier switches | 31 | 7 | 3 |
| Average RMSE | 1.1 dB | 1.92 dB | 2.82 dB |
| Pattern 2 - With refreshment | | | |
| Number of measurement blocks | 4 | 1 | 1 |
| Density of pilots | 50% | 50% | 50% |
| Number of carrier switches | 7 | 2 | 2 |
| Average RMSE | 0.97 dB | 1.7 dB | 1.7 dB |

TABLE 5

Performance of patterns 1 and 2 without refreshment.

| Performance metric | Pattern 1 - Without refreshment | Pattern 2 - Without refreshment |
|---|---|---|
| Number of measurement blocks | 128 | 1 |
| Density of pilots | 50% | 50% |
| Number of carrier switches | 255 | 2 |
| Average RMSE | 0.26 dB | 1.7 dB |

From the above results, we show that thanks it is illustrated that, due to the refreshment mechanism used in certain exemplary embodiments of the invention, a better trade-off can be achieved between the density of pilots and number of carrier switches on one side, and the accuracy of prediction on the other side.

The pattern proposed in FIG. 11 significantly reduces the pilots overhead by trading off the accuracy of prediction from the maximum carrier switching pattern in FIG. 2.

The pattern proposed in FIG. 14 improves the accuracy of the one carrier switching pattern in FIG. 5 by increasing properly the number of carrier switches while keeping the pilots density unchanged.

Thus, exemplary embodiments of the invention that employ refreshment are able to achieve a better trade-off between the accuracy of prediction on one side, and the density of pilots and number of carrier switches on the other side. This is due to the refreshment mechanism. The refreshment mechanism requires knowledge of the shadowing time-correlation and shadowing frequency-correlation, in addition to the signal to noise ratio for pilot observations with noise.

The better trade-off achieved using the refreshment mechanism enables efficient and flexible design of the scanning procedure.

Figure 19:
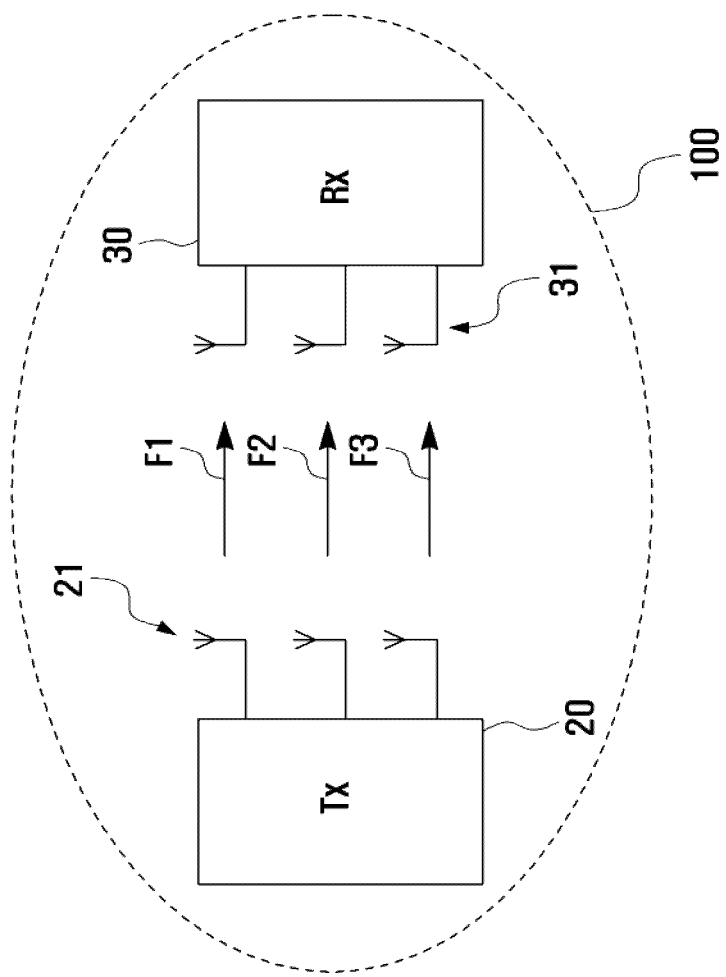
FIG. 19 is a schematic representation of a multi-carrier communication system comprising a transmitter and a receiver according to an exemplary embodiment of the present invention.

FIG. 19 is a schematic representation of a multi-carrier communication system comprising a transmitter and a receiver according to an exemplary embodiment of the present invention.

Referring to FIG. 19, a multi-carrier communication system 100 embodying the invention is illustrated. The communication system or network 100 comprises a transmitter 20 having a plurality of transmitting antennas 21 and a receiver 30 having a plurality of receiving antennas 31. The transmitter 20 is adapted to transmit signals to the receiver 30 using a plurality of carrier signals, each having a respective carrier frequency F1, F2 and F3 respectively. The transmitter and receiver are together adapted to carry out methods embodying the invention (for example methods of estimating link qualities, methods of transmitting a signal, and methods of allocating radio resources). For example, during a scanning time interval the transmitter is able to send respective test or pilot signals in selected ones of the plurality of carrier-time bins and the receiver is adapted to measure the strengths of the corresponding received signals. The combination of transmitter and receiver is then adapted to determine values indicative of predicted quality values of transmission signal links between the transmitter and receiver in each of the carrier-time bins in which no measurement is made during the scanning interval.

Figure 20:
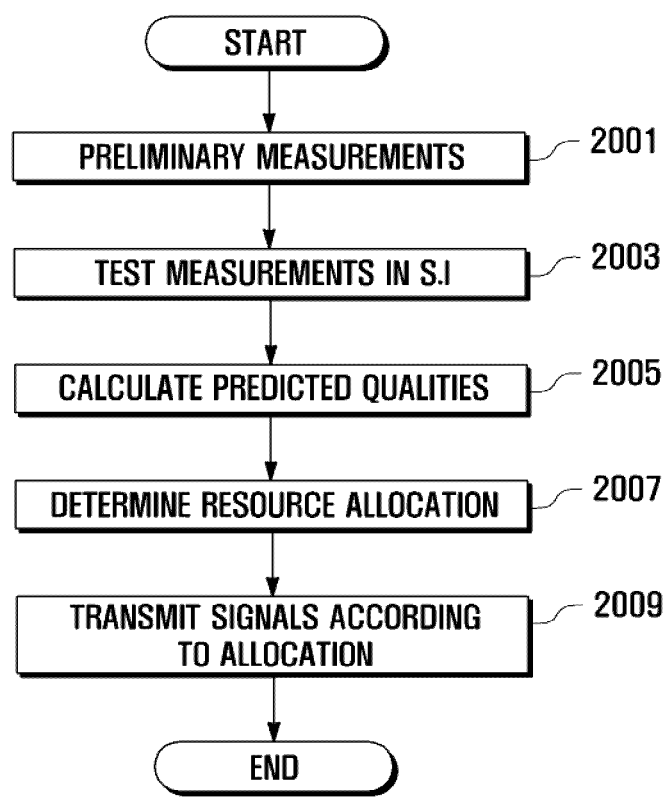
FIG. 20 is a flowchart illustrating a method according to an exemplary embodiment of the present invention.

FIG. 20 is a flowchart illustrating a method according to an exemplary embodiment of the present invention.

Referring to FIG. 20, in a first step 2001 a number of preliminary measurements are made. Each of these preliminary measurements involve the sending of a test signal on at least one carrier frequency and the measurement of the strength of the corresponding received signal. These preliminary measurements are arranged so as to provide information on correlation between shadow fading on the various carrier frequencies useable by the system. These preliminary measurements may then be stored, or alternatively quantities, parameters or values may be determined from them, and those parameters, quantities or values may then be stored for subsequent use.

In step 2003, a plurality of test measurements are made during a scanning interval to measure the quality of links between the transmitter and receiver in a corresponding number of carrier-time bins.

In step 2005, values indicative of predicted link quality for carrier-time bins in which no test measurements are made in step 2003 are made from (i.e. using) the earlier preliminary measurements (or in other words from the results of those measurements) and from the test measurements in the scanning interval.

Having determined these predicted quality values, the method proceeds to step 2007 to determine how to allocate radio resources during subsequent signal transmission. In other words, the measured and predicted qualities for the various communication links between transmitter and receiver are used to decide which carrier frequencies to use, when to use them, and perhaps in what combination.

Finally, in step 2009 signals are transmitted from the transmitter to the receiver using multiple carrier signals allocated (i.e. used) according to the allocation determined or calculated in step 2007.

In FIG. 4, it will be appreciated that the step 405 labeled "shadowing carrier correlation factors" can involve either the input of shadowing carrier correlation factors determined from earlier (i.e. preliminary) measurements or may indeed actually involve the making of appropriate measurements and determining correlation factors from those measurements. The type and range of measurements to be made in order to determine these correlation factors will be apparent to the skilled person, in light of the teaching in reference [1]. The following step of determining shadowing time correlation factor and the next step of determining the shadowing carrier-time correlation matrix both involve use of the shadowing carrier correlation factors and/or the measurements used to determine those shadowing carrier correlation factors. As given in equation 11, $a_{ij}$ is obtained from the shadowing standard deviations $sigma_i$ and $sigma_j$ on carrier frequencies i and j respectively, and shadowing correlation coefficient $\rho_{ij}$. The shadowing standard deviations $sigma_i$ and $sigma_j$ and correlation $\rho_{ij}$, are metrics quantifying the statistics of the shadowing affecting the received signal level measured on carrier i and carrier j using a field experiment as described in, or similar to that described in reference [1]. The field experiment can therefore involve the simultaneous transmission of test signals on more than one carrier frequency, and the measurement with receiver of the corresponding strengths of the simultaneously received signals to give an indication of path loss, and hence shadowing.

As will be appreciated from the above description, certain exemplary methods embodying the invention require and/or use one or more parameters indicative of a rate of variation of received signal strength with time as a result of time-dependent fading in the transmitter-to-receiver signal path. Such parameters include the exponential time decay rate u, and the first order shadowing time correlation lambda. They are each indicative of a rate of variation of received signal strength as a result of shadow fading effects, at least in the sense that they can be used to predict shadow fading at one instant from a measurement of shadow fading at another instant or instants.

In such exemplary embodiments of the invention, values of these parameters can be assumed, recalled or read from a memory, measured, or estimated, or may be obtained by a combination of these techniques.

It will also be appreciated that these parameters may be required or useful for other purposes, not just in the determination/estimation/prediction of link qualities. These parameters can be useful for other purposes, relating to other aspects of communication systems and networks. Furthermore, these parameters are useful not just in multi-carrier systems—they may be used in just single carrier systems. A wide variety of uses for one or more of these parameters will be apparent to the person skilled in the relevant art.

Further exemplary embodiments of the invention will now be described for providing/determining one or more of the above-mentioned parameters. These exemplary embodiments may be used in conjunction with (i.e. combined with) the above-described exemplary embodiments to estimate/predict link qualities, may be used on their own, or may be combined with other techniques for other purposes.

Certain of these further exemplary embodiments may be described as providing methods for estimating shadowing time correlation parameters in wireless networks. Certain of these exemplary embodiments apply to the radio interface of wireless networks. Examples of such networks are GSM, UMTS, HSPA, 3GPP LTE, WiMAX EEE802.16, etc. Again, this list is not to be construed as limiting the application of the present invention but is merely an example of systems to which the invention may be applied.

Certain exemplary embodiments provide a method for accurate estimation of the first order shadowing time correlation and exponential time decay rate during a given scanning time interval.

For the time-correlation of the shadowing h(t), an exponential model validated by reference [2] is commonly used. The model can be written as given in reference [3] as:

$$h(t_0 + t) = h(t_0)\lambda + n(t)(1 - \lambda^2)^{1/2}; \lambda = \exp\left(\frac{-ut}{2}\right) \quad (1001)$$

where n(t) is a Gaussian random variable with zero mean and same standard deviation as h(t), and it is independent with h($t_0$). The parameter $\lambda$ in (1001) is called the first order shadowing time correlation. The parameter u is called as exponential time decay rate.

We look here for a method to achieve a high estimation accuracy for the parameters $\mu$ and u. The estimation is based on the shadowing samples measured by the receiver during a given time period.

For the first order shadowing time correlation $\lambda$, we propose the following:

$$\lambda = \frac{N_{\Delta t}}{N_{\Delta t} - 1} \frac{\sum_{n=1}^{N_{\Delta t}-1} h(t_0 + n\Delta t)h(t_0 + (n-1)\Delta t)}{\sum_{n=0}^{N_{\Delta t}-1} (h(t_0 + n\Delta t))^2} \quad (2000)$$

where $N_{\Delta t}$ represents the number of shadowing samples used for the estimation, and $\Delta t$ is the time resolution at which shadowing samples are measured. Once the correlation $\lambda$ is determined from (2000), the exponential time decay rate u can then be deduced as follows:

$$\hat{u} = \frac{-2}{\Delta t}\log(\lambda) \quad (3000)$$

Two solutions are studied and compared. One is online and relatively straightforward, whereas the other one is offline and represents an exemplary embodiment of this invention.

The online solution simply takes the samples measured during the scanning time interval at the scanning time resolution. The time resolution is therefore fixed by the scanning sampling time $\Delta t$ and the time interval length is fixed by the scanning time interval. The advantage of this method is that the estimation is straightforward and only relies on the shadowing samples which are available. The disadvantage is that there is no flexibility in determining the time interval and time resolution since it is fixed by the scanning sampling time and scanning interval.

Proposed Offline Solution

The offline solution aims at mitigating a disadvantage of the online solution by targeting a high capability of averaging in order to achieve accurate estimation in (2000) and thus (3000).

In the offline solution, we start from the following model of the rate u [3]:

$$u = \frac{2v}{\xi} \quad (4000)$$

where v is the speed of the mobile, and $\xi$ is the effective correlation distance of the shadow fading. This latter is defined as the distance at which the normalized correlation (i.e. normalized by variance $\sigma^2$) falls to exp(−1) [5]. This effective distance is in the order of a few tens of meters (e.g. 20 m, 50 m) and it is found to be only dependent on the environment.

In accordance with an exemplary embodiment of the present invention, the following steps are performed:

Step 1: (Initialization)
Setup a reference effective correlation distance $\xi_0$. For instance, knowing that parameter $\xi$ ranges between 10 m and 50 m, a reference value $\xi_0$ would be the average i.e. 30 m.

Step 2: (Initialization)
Perform measurement of the mobile speed $v_0$ at given reference time $t_0$.

Step 3: (Initialization)
Setup a time interval and corresponding time resolution $\delta$ specific to the speed of the mobile so that to ensure sufficient number of independent shadowing samples. The time interval is set as proposed hereafter:

$$T_{uest} = C_1 \frac{\xi_0}{v_0}; \delta = \frac{T_{uest}}{C_2} \quad (5000)$$

where $v_0$ is the mobile speed during the interval [$t_0, t_0+T_{uest}$]. The mobile speed can be easily and accurately estimated using various techniques (see [9] for an example). The estimation/measurement of the mobile speed (i.e. the speed or velocity of the receiver, for example in the form of a mobile phone, PDA, or other portable or mobile communications apparatus) may be achieved using a variety of techniques that will be apparent to the person skilled in the relevant art.

The parameters $C_1$ and $C_2$ are predetermined constants.

Step 4: (Initialization)

Perform measurement of the shadowing samples only once (e.g. when the mobile is powered on) at the given time resolution $\delta$ and during the time interval $[t_0, t_0 + T_{uest}]$ defined in Step 3.

Step 5: (Initialization)

Estimate first order time correlation $\lambda$ and exponential time decay rate u by applying (2000) and (3000), respectively. This yields an estimate $u_0$ specific to the mobile speed $v_0$.

Step 6: (when the Scanning Procedure has to Take Place)

At any time $t_n$ within the scanning interval, measure only the mobile speed $v_n$.

Step 7: (when the Scanning Procedure has to Take Place)

Deduce the parameter $u_n$ at time $t_n$ within the scanning interval from the mobile speed $v_n$ by applying the formula below:

$$\hat{u}_n = \frac{\hat{u}_0}{v_0} v_n \quad (6000)$$

Performance Evaluation

The values of parameters needed to evaluate the performance of online and offline proposed solutions are summarized in table 6 below.

TABLE 6

Simulation parameters.

| Parameter | Value |
|---|---|
| Reference effective shadowing correlation distance $\xi_0$ | 30 m |
| Effective shadowing correlation distance $\xi$ | Uniformly distributed between 10 m and 50 m |
| Constant parameter $C_1$ | 10 |
| Constant parameter $C_2$ | 100 |
| Initial mobile speed $v_0$ | Uniformly distributed between actual speed ± 5 kmh |
| Actual mobile speed v | [10, 30, 60, 90, 120] kmh |
| Scanning time resolution | 5 ms |
| Scanning time interval | 100 ms, 1275 ms |

Figure 21:
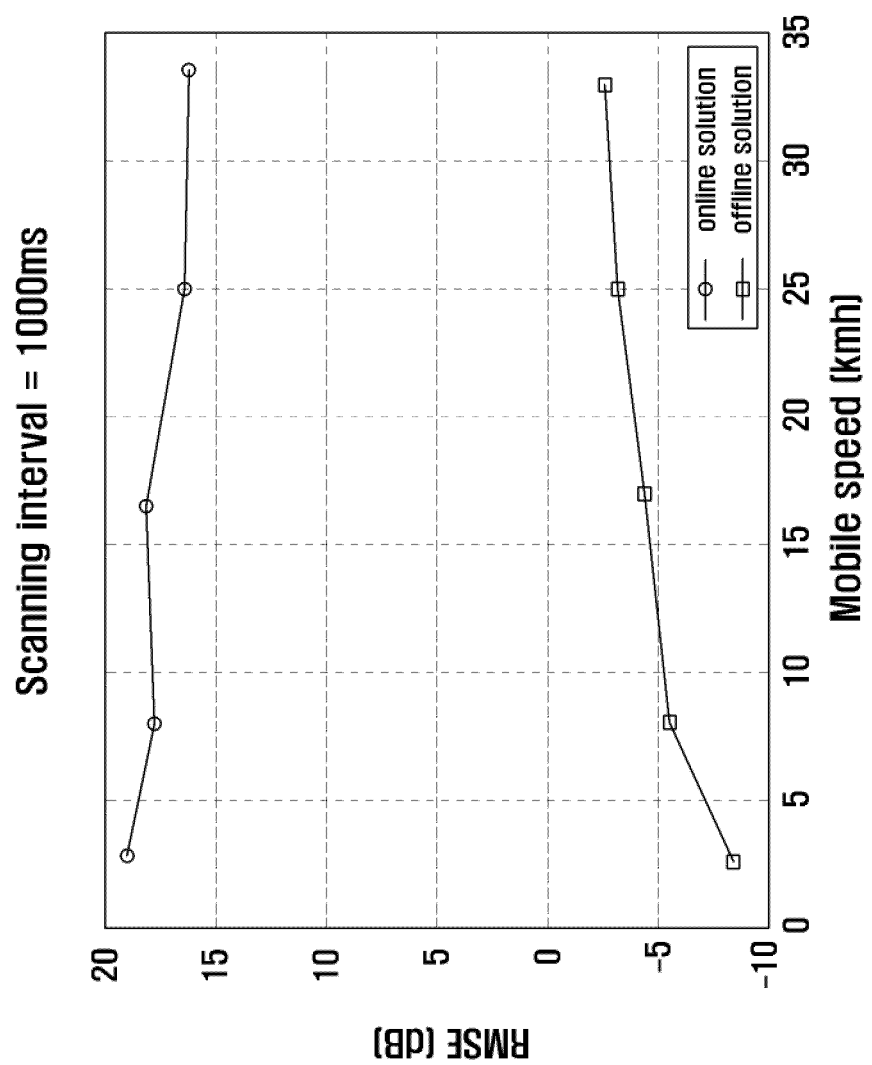
FIG. 21 is a plot of relative RMSE as a function of mobile speed for a scanning interval of 100 ms according to an exemplary embodiment of the present invention.

FIG. 21 is a plot of relative RMSE as a function of mobile speed for a scanning interval of 100 ms according to an exemplary embodiment of the present invention.

Referring to FIG. 21, the relative RMSE (dB) for the estimation of the exponential time decay rate u versus the mobile speed (kmh) for a scanning interval equal to 100 ms is illustrated. The offline solution (a) achieves a significant improvement in the accuracy as compared to the online solution (b). It is important also to note that the online solution has its accuracy improved when the mobile speed increases since for the given fixed scanning interval the shadowing exhibits more time variation which increases the averaging capability in (2000).

The opposite happens for the offline solution, a decrease in accuracy when the mobile speed increases, this is because the length $T_{uest}$ in (5000) of the reference interval decreases with the mobile speed which lowers the averaging capability in (2000).

Figure 22:
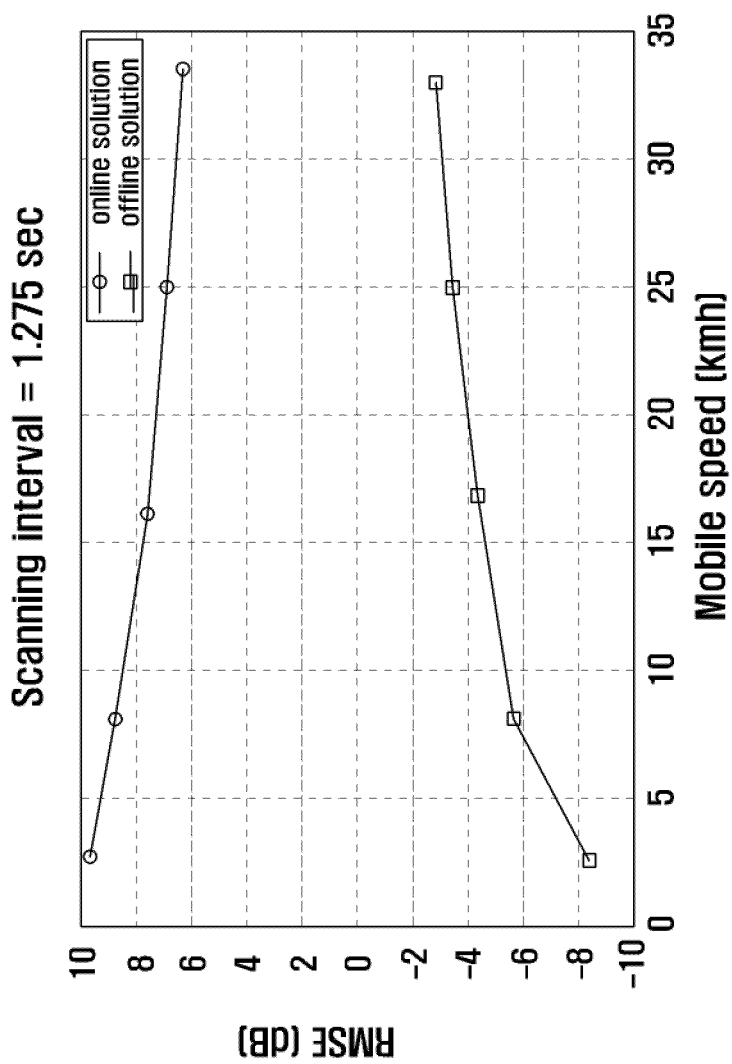
FIG. 22 is a plot of relative RMSE as a function of mobile speed for a scanning interval of 1.275 s according to an exemplary embodiment of the present invention.

FIG. 22 is a plot of relative RMSE as a function of mobile speed for a scanning interval of 1.275 s according to an exemplary embodiment of the present invention.

Referring to FIG. 22, the relative RMSE (dB) for the estimation of the exponential time decay rate u versus the mobile speed (kmh) for a scanning interval equal to 1.275 s is illustrated. The performance of the offline solution (a) is not affected, whereas the performance of the online solution (b) improves significantly due to the higher averaging capability due to the longer scanning time interval. Even though the performance of the online solution improves, the offline solution still achieves much higher accuracy.

The proposed offline solution achieves a significantly higher estimation accuracy. In addition, it needs to estimate the first order correlation $\lambda$ from (2000) only once (e.g. when the mobile terminal is powered on) to determine the exponential time decay rate u, which saves time, and processing power, as opposed to the online solution where the first order correlation has to be estimated at each scanning interval.

The offline and online solutions need to estimate the mobile speed, but this is a very simple task and inherently performed in various systems, methods, and configurations since it is a parameter requested for a number of different applications and mechanisms.

It will be appreciated that in different exemplary embodiments of the invention, the preliminary measurements, if made, may be made at different times. For example, in certain exemplary embodiments they may be made on switch on. In certain exemplary embodiments they may be made periodically, for example more or less frequently than, or as frequently as the scanning interval measurements. The time(s) at which the preliminary measurements are made may depend on the preliminary measurement indicative. For instance, if the measurements are arranged to determine the shadowing standard deviations, and correlation, they can be done during the network planning phase, and then updated on a very long term time scale (e.g. couple of days). If the measurements are to determine parameters such as the shadowing time correlation, then they can be performed on the switch on or periodically, or on-demand but prior to the scanning interval.

In accordance with exemplary embodiments of the present invention, the preliminary measurements may be made using the same receiver that will subsequently be used to make the scanning interval measurements. In certain alternative exemplary embodiments some other apparatus may be used, and the results then stored for use by a variety of receiving equipment. In other words, some preliminary measurements may be made and stored, those results being indicative of typical time and carrier correlation of received signals in the general environment of the transmitter. Some preliminary measurements may be specific to a particular combination of transmitter and receiver. What apparatus is used to perform the preliminary measurements may depend on the indicatives or metrics needed. For example, for shadowing standard deviations and shadowing carrier correlation, the measurements can be done during the network planning phase, with a field test receiver, thus not the one used by users. Thus, they can be stored in a database specific to each cell in a cellular system and then updated on a very long term scale. For measurements to determine the shadowing time correlation parameters, they may be specific to the mobile user, and so may need to be measured by the user apparatus.

It will be appreciated that, in certain exemplary embodiments, a value indicative of a link quality may be determined for each carrier-time bin. On such quality factor which may be determined in exemplary embodiments of the invention, and used to determine radio resource allocation, is as follows:

$$\hat{q}_{f_k}(n) = \qquad (101)$$

$$10\log_{10}\left(\frac{B_{f_p}}{B_{f_k}}\frac{P(n)}{N_{f_p}}\right) + \left(K_{f_k} - \frac{\alpha_{f_k}}{\alpha_{f_p}}K_{f_p}\right) + \frac{\alpha_{f_k}}{\alpha_{f_p}}gd_{f_p}(n) + \hat{h}_{f_k}(n)$$

where all notations in (101) can be found above. Thus, equation 101 is an equation for link quality prediction on k-th secondary carrier frequency bin. The predicted value $\hat{h}_{f_k}(n)$ is obtained as follows:

$$\hat{h}_{fk}(n) = W_{kn}{}^T R_{kn} \qquad (201)$$

with $W_{kn}$ being the vector of filter coefficients used to predict the shadowing $h_{fk}(n)$ on k-th carrier frequency bin at n-th time bin, and $R_{kn}$ is the corresponding vector of observations.

It will be appreciated that exemplary embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments of the present invention provide a program comprising code for implementing a system or method as claimed in any one of the claims of this specification and a machine-readable storage storing such a program. Still further, such programs may be conveyed electronically via any medium such as a communication signal carried over a wired or wireless connection and exemplary embodiments suitably encompass the same.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, exemplary embodiment or example of the invention are to be understood to be applicable to any other aspect, exemplary embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for estimating qualities of links between a transmitter and a receiver on respective carrier frequencies in a multi-carrier wireless communication system from measurements made during a scanning interval in which pilot signals may be transmitted from the transmitter to the receiver in a plurality of carrier-time bins, each carrier-time bin corresponding to a respective carrier frequency of the multi-carrier system and a respective time slot within the scanning interval, the method comprising:
   during the scanning interval, making test measurements in less than all of the carrier-time bins, each test measurement comprising transmitting a respective signal from the transmitter to the receiver in a respective carrier time bin and measuring a strength of the corresponding signal received by the receiver; and
   using the test measurements to determine:
      a value indicative of a predicted quality of a link between the transmitter and the receiver in a carrier-time bin of the scanning interval in which no test measurement is made during the scanning interval; and
      a value indicative of a predicted quality of a link between the transmitter and the receiver over a period of time within or equal to the scanning interval on a carrier frequency for which no test measurement is made in at least one carrier-time bin during said period of time.

2. The method of claim 1, further comprising:
   prior to the scanning interval, making a plurality of preliminary measurements, said preliminary measurements being indicative of at least one of:
      a variation with time in a quality of a link between the transmitter and the receiver on at least one of said carrier frequencies in the multi-carrier wireless communication system; and
      a correlation between the quality of a link between the transmitter and the receiver on one of said carrier frequencies in the multi-carrier system and a quality of a link between the transmitter and the receiver on at least one different one of said carrier frequencies in the multi-carrier system.

3. The method of claim 1, wherein said making of said test measurements comprises:
   making a first plurality of said test measurements in a first period of the scanning interval, the first plurality of test measurements comprising a respective test measurement on each of the plurality of carrier frequencies.

4. The method of claim 3, wherein each of the first plurality of test measurements is made in a different respective time slot.

5. The method of claim 3, wherein said using of the test measurements comprises determining a respective value indicative of a predicted quality of a link between the transmitter and the receiver in each carrier-time bin of the first period of scanning interval in which no test measurement is made from all of the first plurality of measurements.

6. The method of claim 3, wherein said using of the test measurements comprises determining a respective value indicative of a predicted quality of a link between the transmitter and the receiver in each carrier-time bin of the first period of the scanning interval in which no test measurement is made by multiplying a result of a respective one of the first plurality of test measurements by a respective multiplication factor.

7. The method of claim 6, wherein the respective multiplication factor is determined from preliminary measurements.

8. The method of claim 3, wherein said making of said test measurements comprises:
   making a second plurality of said test measurements in a second period of the scanning interval, the second plurality of test measurements comprising a respective test measurement on each of the plurality of carrier frequencies.

9. The method of claim 8, wherein each of the second plurality of test measurements is made in a different respective time slot.

10. The method of claim 8, wherein said using of the test measurements comprises determining a respective value indicative of a predicted quality of a link between the transmitter and the receiver in each carrier-time bin of the second period of the scanning interval in which no test measurement is made from all of the second plurality of measurements.

11. The method of claim 8, wherein the second period of the scanning interval is immediately after the first period of the scanning interval.

12. The method of claim 8, wherein the second period of the scanning interval begins a time interval after the end of the first period of the scanning interval.

13. The method of claim 12, further comprising determining the delay time interval.

14. The method of claim 12, wherein said making of said test measurements comprises:
   making a third plurality of said test measurements in a third period of the scanning interval, the third period being between the first and second periods.

15. The method of claim 14, wherein each of the third plurality of test measurements is made in a different respective time slot on the same carrier frequency.

16. The method of claim 14, wherein said using of the test measurements comprises determining a respective value indicative of a predicted quality of a link between the transmitter and the receiver in each carrier-time bin of the third period of scanning interval in which no test measurement is made from a measurement made in another carrier-time bin of the third time period and at least one test measurement made during the first time period.

17. The method of claim 12, comprising making no test measurements between the first and second periods.

18. The method of claim 8, wherein said making of said test measurements comprises:
   making a fourth plurality of said test measurements in a fourth period of the scanning interval, the fourth period being after the second period.

19. The method of claim 18, wherein each of the fourth plurality of test measurements is made in a different respective time slot on the same carrier frequency.

20. The method of claim 1, wherein the receiver comprises a mobile receiver traveling at a speed v(t), the method further comprising:
   measuring a first speed $v_0$ of the mobile receiver at a first time $t_o$;
   performing a plurality of measurements of received signal strength at the mobile receiver versus time on at least one carrier frequency in a first time period following said first time;
   determining from the first plurality of measurements a first value of a parameter indicative of a rate of variation of a received signal strength with time at the mobile receiver resulting from time-dependent fading between the transmitter and the receiver;
   measuring a second speed $v_n$ of the mobile receiver at a second, later time $t_n$; and
   determining a second value of said parameter, indicative of a second rate of said variation corresponding to speed $v_n$, from the said first value and the first and second speeds.

21. The method of claim 20, further comprising using said second value to determine at least one of said values indicative of a predicted quality of a link.

22. The method of claim 20, wherein said performing of said plurality of measurements is performed before the scanning interval.

23. The method of claim 20, further comprising determining a measurement time interval according to the first speed, wherein said performing a plurality of measurements comprises performing a respective measurement of received signal strength at each of a series of times, adjacent said times being separated by the measurement time interval.

24. The method of claim 20, wherein said second time falls within the scanning interval.

25. The method of claim 20, wherein said parameter indicative of a rate of variation of a received signal strength with time is an exponential time decay rate parameter u.

26. The method of claim 25, wherein said first value is $u_0$, said second value is $u_n$, and $u_n = u_0 \cdot (v_n/v_0)$.

27. A method of determining a value of a parameter indicative of a rate of variation of a received signal strength with time at a mobile receiver, traveling at a speed v(t), as a result of time-dependent fading between a transmitter and the mobile receiver, the method comprising:
   measuring a first speed $v_0$ of the mobile receiver at a first time $t_o$;
   performing a plurality of measurements of received signal strength at the mobile receiver versus time in a first time period following said first time;
   determining from the first plurality of measurements a first value of a parameter indicative of a first rate of said variation of received signal strength with time;
   measuring a speed $v_n$ of the mobile receiver at a later time $t_n$; and
   determining a second value of said parameter, indicative of a second rate of said variation corresponding to speed $v_n$, from the first said value and the first and second speeds.

28. The method of claim 27, further comprising determining a measurement time interval according to the first speed, wherein said performing of said plurality of measurements comprises performing a respective measurement of received signal strength at each of a series of times, adjacent said times being separated by the measurement time interval.

29. The method of claim 28, wherein said parameter indicative of a rate of variation of a received signal strength with time comprises an exponential time decay rate parameter u.

30. The method of claim 29, wherein said first value is $u_0$, said second value is $u_n$, and $u_n = u_0 \cdot (v_n/v_0)$.

31. A computer readable medium having stored thereon instructions arranged, when executed, to implement a method for estimating qualities of links between transmitter and receiver on respective carrier frequencies in a multi-carrier wireless communication system from measurements made during a scanning interval in which pilot signals may be transmitted from the transmitter to the receiver in a plurality of carrier-time bins, each carrier-time bin corresponding to a respective carrier frequency of the multi-carrier system and a respective time slot within the scanning interval, the method comprising:
   during the scanning interval, making test measurements in less than all of the carrier-time bins, each test measurement comprising transmitting a respective signal from the transmitter to the receiver in a respective carrier time bin and measuring a strength of the corresponding signal received by the receiver; and using the test measurements to determine:

a value indicative of a predicted quality of a link between the transmitter and the receiver in a carrier-time bin of the scanning interval in which no test measurement is made during the scanning interval; and a value indicative of a predicted quality of a link between the transmitter and the receiver over a period of time within or equal to the scanning interval on a carrier frequency for which no test measurement is made in at least one carrier-time bin during said period of time.

\* \* \* \* \*